United States Patent
Tsai et al.

(10) Patent No.: US 12,170,854 B2
(45) Date of Patent: Dec. 17, 2024

(54) NOISE-REDUCTION CIRCUIT FOR AN IMAGE SENSOR

(71) Applicant: Meta Platforms Technologies, LLC, Menlo Park, CA (US)

(72) Inventors: Tsung-Hsun Tsai, Redmond, WA (US); Lyle David Bainbridge, Redwood City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 51 days.

(21) Appl. No.: 17/950,199

(22) Filed: Sep. 22, 2022

(65) Prior Publication Data

US 2023/0105527 A1    Apr. 6, 2023

Related U.S. Application Data

(60) Provisional application No. 63/252,420, filed on Oct. 5, 2021.

(51) Int. Cl.
*H04N 25/673*    (2023.01)
(52) U.S. Cl.
CPC ................. *H04N 25/673* (2023.01)
(58) Field of Classification Search
CPC ............... H04N 25/673; H04N 25/674
See application file for complete search history.

(56) References Cited

U.S. PATENT DOCUMENTS

| 6,614,562 B1* | 9/2003 | Minemier | H04N 25/63 348/E5.081 |
| 2003/0174901 A1* | 9/2003 | Staudacher | H04N 25/63 348/E5.081 |
| 2007/0273775 A1* | 11/2007 | Jiang | H04N 25/63 348/E5.081 |
| 2008/0151081 A1 | 6/2008 | Frank | |

(Continued)

FOREIGN PATENT DOCUMENTS

| EP | 3425353 A1 | 1/2019 |
| WO | 2019222364 A1 | 11/2019 |

OTHER PUBLICATIONS

International Search report and Written Opinion for International Application No. PCT/US2022/045505, mailed Jan. 4, 2023, 9 pages.

*Primary Examiner* — Michael Lee
(74) *Attorney, Agent, or Firm* — Kilpatrick Townsend & Stockton LLP

(57) ABSTRACT

Some examples described herein include a noise-reduction circuit for an image sensor. The noise-reduction circuit can include a reference frame generator configured to generate a reference frame based on a set of image frames received from an image sensor during a calibration phase. The noise-reduction circuit can also include a memory coupled to the reference frame generator. The memory can receive the reference frame from the reference frame generator and store the reference frame for subsequent use during a noise-reduction phase. The noise-reduction circuit can further (Continued)

include a processor coupled to the memory. The processor can retrieve the reference frame from the memory and use the reference frame to reduce noise in an image frame received from the image sensor during the noise-reduction phase.

19 Claims, 19 Drawing Sheets

(56) References Cited

U.S. PATENT DOCUMENTS

| | | | | |
|---|---|---|---|---|
| 2008/0309802 | A1* | 12/2008 | Widenhorn | H04N 25/63 |
| | | | | 348/E9.037 |
| 2010/0165122 | A1* | 7/2010 | Castorina | G06T 5/50 |
| | | | | 348/241 |
| 2012/0026359 | A1* | 2/2012 | Fukushima | H04N 23/71 |
| | | | | 348/226.1 |
| 2015/0281606 | A1* | 10/2015 | Livneh | H04N 25/63 |
| | | | | 348/243 |
| 2017/0142354 | A1* | 5/2017 | Hitomi | H04N 23/6845 |
| 2020/0400571 | A1* | 12/2020 | Talbert | G09F 15/0006 |
| 2021/0049773 | A1* | 2/2021 | Paxton | G06T 7/248 |
| 2022/0385842 | A1* | 12/2022 | Price | G06T 3/40 |
| 2023/0096541 | A1* | 3/2023 | Takahashi | G06T 5/50 |
| | | | | 345/629 |

* cited by examiner

NOISE-REDUCTION CIRCUIT FOR AN IMAGE SENSOR

REFERENCE TO RELATED APPLICATION

This application claims priority to U.S. provisional patent application Ser. No. 63/252,420, filed Oct. 5, 2021, entitled, "ON-CHIP SENSOR NOSIE CORRECTION APPARATUS," which is hereby incorporated by reference in its entirety.

TECHNICAL FIELD

The present disclosure relates generally to image sensors. More specifically, but not by way of limitation, this disclosure relates to a noise-reduction circuit for an image sensor, such as a digital pixel sensor.

BACKGROUND

An image sensor can include an array of pixel cells. Each pixel cell may include a photodiode to sense light by converting photons into electric charge (e.g., electrons or holes). The electric charge generated by the array of photodiodes can then be quantized by an analog-to-digital converter (ADC) into digital values to generate a digital image. The digital image may be transmitted from the image sensor to another system for use by the other system.

SUMMARY

One example described herein includes a noise-reduction circuit. The noise-reduction circuit comprises a reference frame generator configured to generate a reference frame based on a plurality of image frames received from an image sensor during a calibration phase. The noise-reduction circuit also comprises a memory coupled to the reference frame generator, the memory being configured to receive the reference frame from the reference frame generator and store the reference frame for subsequent use during a noise-reduction phase that is subsequent to the calibration phase. The noise-reduction circuit further comprises a processor coupled to the memory, the processor being configured to retrieve the reference frame from the memory and use the reference frame to reduce noise in an image frame received from the image sensor during the noise-reduction phase.

Another example described herein involves a method comprising: receiving a plurality of image frames from an image sensor during a calibration phase; generating a reference frame based on the plurality of image frames; receiving an image frame from the image sensor during a noise-reduction phase that is subsequent to the calibration phase; and using the reference frame to reduce noise in the image frame. Some or all of these operations can be performed by a noise-reduction circuit.

Yet another example described herein involves an artificial reality system. The artificial reality system comprises an image sensor and a noise-reducing circuit coupled to the image sensor. The noise-reducing circuit is configured to: receive a plurality of image frames from the image sensor during a calibration phase; generate a reference frame based on the plurality of image frames; receive an image frame from the image sensor during a noise-reduction phase that is subsequent to the calibration phase; and generate a corrected image frame by using the reference frame to reduce noise in the image frame. The artificial reality system further comprises a computer system coupled to the noise-reducing circuit and a display device, the computer system being configured to generate an artificial reality environment for display on the display device based on the corrected image frame generated by the noise-reducing circuit.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

Illustrative embodiments are described with reference to the following figures.

Figure 1A:
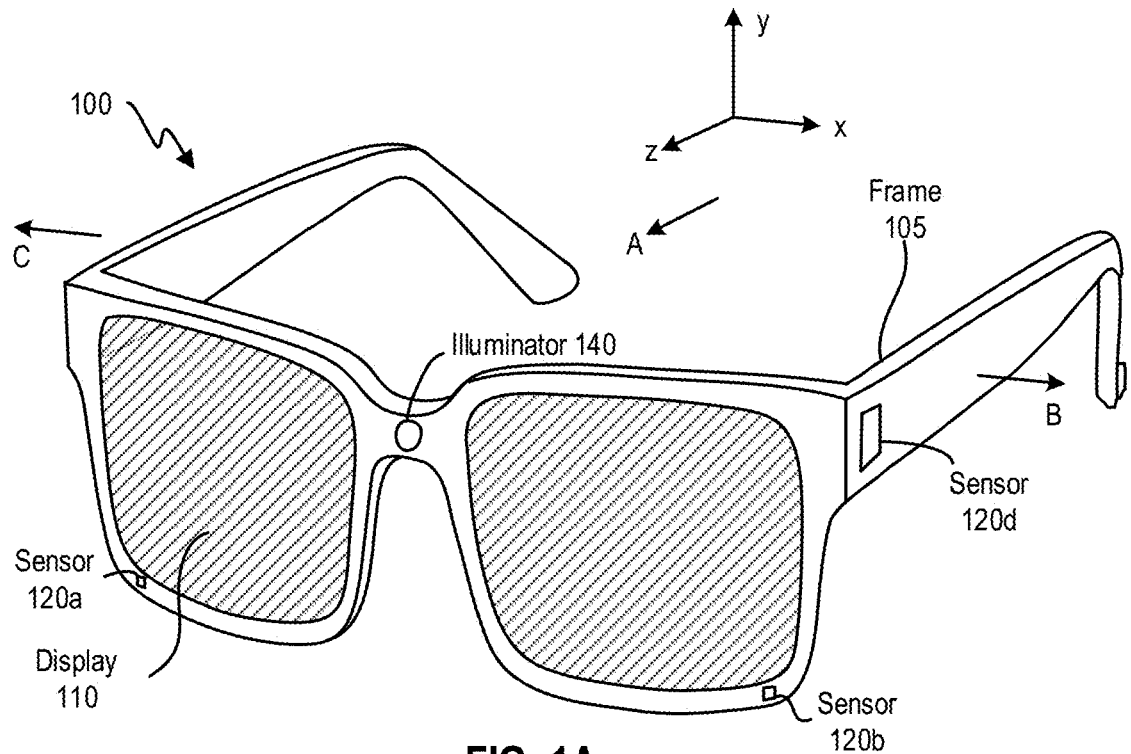
FIGS. 1A, 1B, 1C and 1D are diagrams of an embodiment of a near-eye display.

The figures depict some examples of the present disclosure for purposes of illustration only. One skilled in the art will readily recognize from the following description that alternative examples of the structures and methods illustrated may be employed without departing from the principles, or benefits touted, of this disclosure.

In the appended figures, similar components and/or features may have the same reference label. Further, various components of the same type may be distinguished by following the reference label with a lowercase letter that distinguishes among the similar components. If only the reference label is used in the specification, the description is applicable to any one of the similar components having the same reference label irrespective of the corresponding lowercase letter.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Image sensors (e.g., digital pixel sensors) can include an array of pixel cells. Each pixel cell may include a photodiode to sense light by converting photons into electric charge. The electric charges generated by the array of photodiodes can then be quantized by analog-to-digital converters (ADCs) into digital values to generate a digital image. In some types of image sensors, every pixel may have its own ADC for quantizing the pixel's electric charges into digital values. In some cases, the ADCs may be manufactured on the same chip as the pixel array. As a result, many ADCs may be compacted within the small footprint of the image sensor. To fit within the small footprint of the image sensor, these ADCs must be very small in size. The small size of such ADCs can make them difficult to manufacture in a consistent, high-quality manner. Due to these manufacturing inconsistencies, a single image sensor may be constructed with ADCs that behave differently from one another, sometimes significantly, which can produce noise in the resulting digital image.

The noise described above can include multiple noise components. Two examples of such noise components can include fixed pattern noise and temporal noise. Fixed pattern noise can be a spatial variation in pixel output values that occurs under uniform illumination due to small differences in the properties of the pixels. Fixed pattern noise is "fixed" in the sense that it is temporally constant and results in the same pattern of variation in pixel brightness occurring in images taken under the same illumination conditions. In contrast, temporal noise can be random noise that varies independently from image to image and changes over time. The overall noise observed in a digital image can result from a combination of fixed pattern noise and temporal noise. It can be challenging to remove fixed pattern noise and temporal noise from a digital image. Existing noise-reduction techniques may remove one type of noise or the other, but not both, resulting in digital images that still have residual noise.

Some examples of the present disclosure can overcome one or more of the abovementioned problems by providing a noise-reduction circuit capable of reducing both fixed pattern noise and temporal noise in an image frame captured by an image sensor. For example, the noise-reduction circuit can implement a calibration phase involving capturing N image frames from the image sensor, where N is more than one. One example of N may be 10 image frames, though other amounts of image frames are possible. The noise-reduction circuit can then generate a reference frame based on the N image frames, for example by averaging together the N image frames. Generating the reference frame using multiple image frames can help account for temporal noise, whereas using only single image frame may be insufficient to account for the temporal noise. After generating the reference frame, the noise-reduction circuit can store the reference frame in memory (e.g., an SRAM frame buffer). This may complete the calibration phase.

Next, the noise-reduction circuit can initiate a noise-reduction phase. In the noise-reduction phase, the noise-reduction circuit can receive additional image frames from the image sensor and use the stored reference frame to reduce noise in the additional image frames. For example, the noise-reduction circuit can subtract the stored reference frame from each of the additional image frames to generate corresponding corrected image frames. The corrected image frames can have less fixed pattern noise and/or temporal noise than was present prior to the noise correction (e.g., noise cancellation).

Having generated the corrected image frames, the noise-reduction circuit can then transmit the corrected image frames to a computing system for subsequent use. For example, the computing system can use the corrected image frames for various purposes, such as object recognition and tracking, location tracking, augmented reality (AR), and virtual reality (VR). By using the noise-corrected digital images, the computing system may be able to perform its intended functionality in an improved manner.

The above introduction is provided merely as an example, not to limit or define the limits of the present subject matter. Various other examples are described herein and variations of such examples would be understood by one of skill in the art. Advantages offered by various examples may be further understood by examining this specification and/or by practicing one or more examples of the claimed subject matter.

Figure 1B:
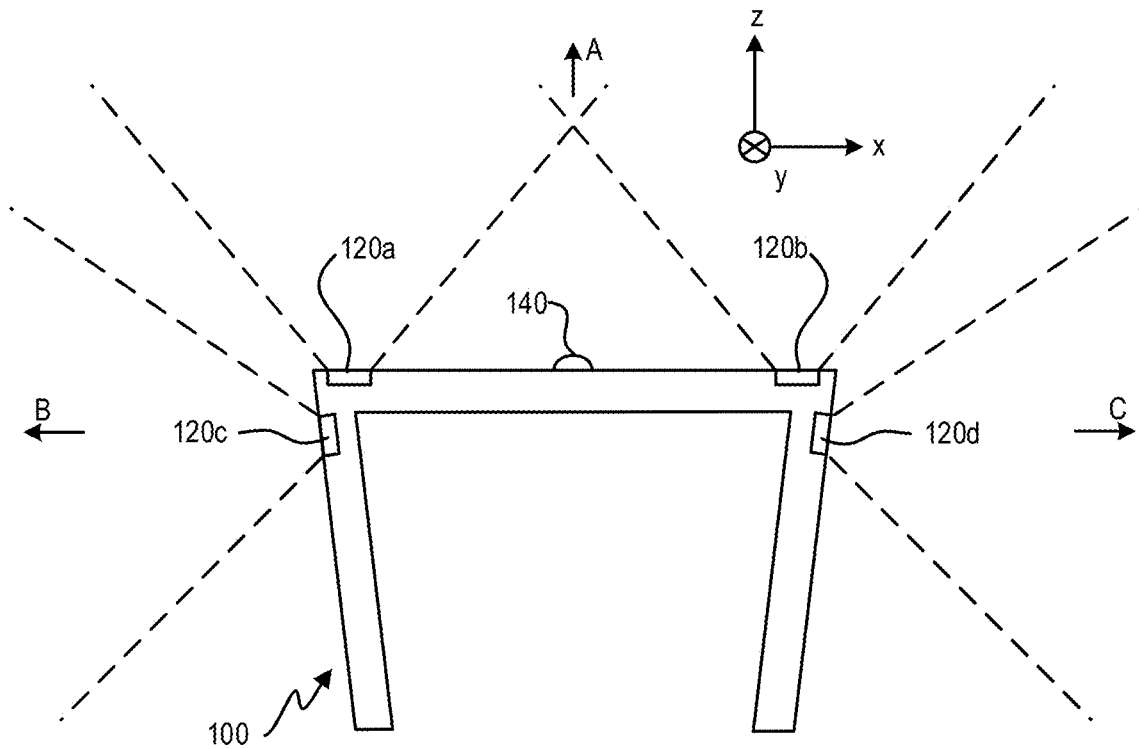

FIGS. 1A and 1B are diagrams of an embodiment of a near-eye display 100. The near-eye display 100 presents media to a user. Examples of media presented by the near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 includes a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a simultaneous localization and mapping (SLAM) algorithm to track a set of objects in the physical environment and within a view of field of the user as the user moves within the physical environment. The location tracking system can construct and update a map of the physical environment based on the set of objects and track the location of the user within the map. By providing image data corresponding to multiple fields of views, sensors 120a-120d can provide the location tracking system with a more holistic view of the physical environment, which can lead to more objects being included in the construction and updating of the map. With such an arrangement, the accuracy and robustness of tracking a location of the user within the physical environment can be improved.

In some embodiments, near-eye display 100 may further include one or more active illuminators 140 to project light into the physical environment. The light projected can be associated with different frequency spectrums (e.g., visible light, infrared light, ultraviolet light), and can serve various purposes. For example, illuminator 140 may project light in a dark environment (or in an environment with low intensity of infrared light, ultraviolet light, etc.) to assist sensors 120a-120d in capturing images of different objects within the dark environment to, for example, enable location tracking of the user. Illuminator 140 may project certain markers onto the objects within the environment, to assist the location tracking system in identifying the objects for map construction/updating.

In some embodiments, illuminator 140 may also enable stereoscopic imaging. For example, one or more of sensors 120a or 120b can include both a first pixel array for visible light sensing and a second pixel array for infrared (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 140 may project a set of IR markers on the object, the images of which can be captured by the IR pixel array. Based on a distribution of the IR markers of the object as shown in the image, the system can estimate a distance of different parts of the object from the IR pixel array and generate a stereoscopic image of the object based on the distances. Based on the stereoscopic image of the object, the system can determine, for example, a relative position of the object with respect to the user and can update the image data provided to display 110 based on the relative position information to provide the interactive experience.

As discussed above, the near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 140 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1C:
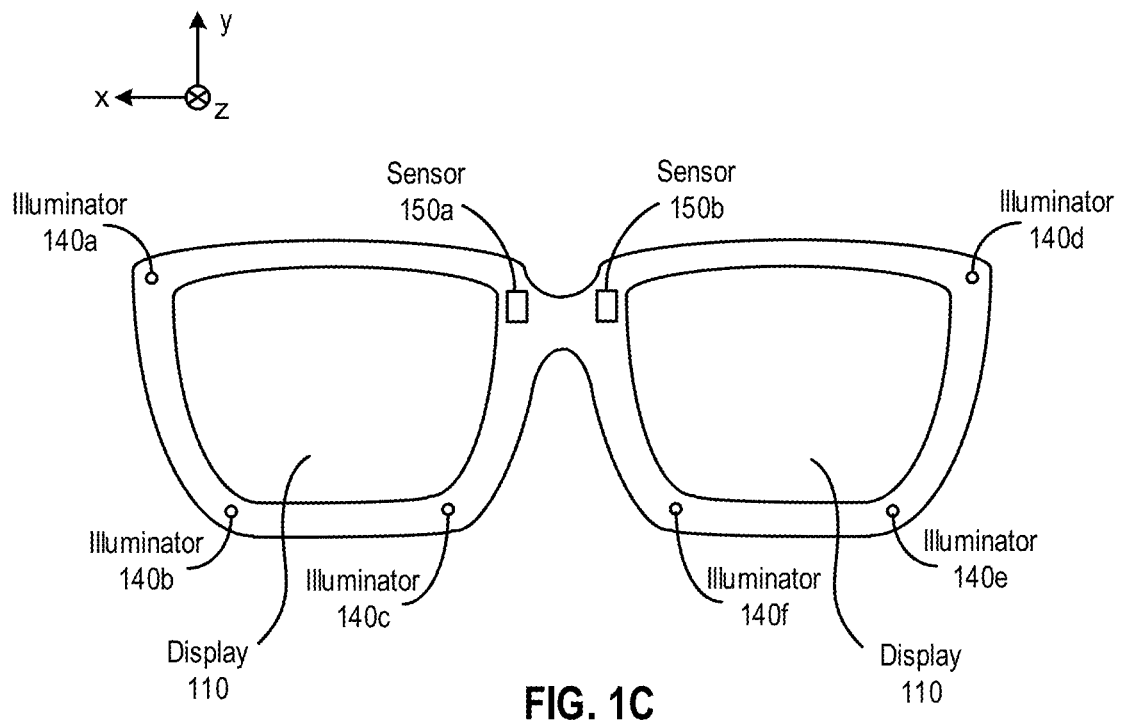
Figure 1D:
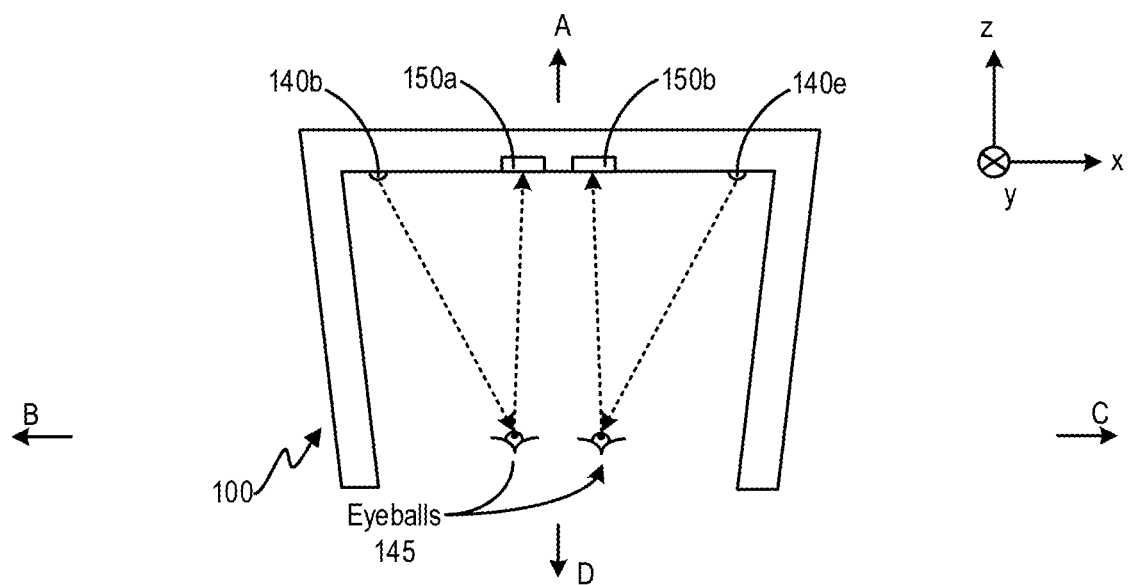

FIGS. 1C and 1D are diagrams of another embodiment of near-eye display 100. FIGS. 1C and 1D illustrate a side of near-eye display 100 that faces the eyeball(s) 135 of the user who wears near-eye display 100. As shown in FIGS. 1C and 1D, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., near infrared (NIR)) towards direction D (which is opposite to direction A of FIGS. 1A and 1B). The emitted light may be associated with a certain pattern and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user and may be received by sensor 150b. Sensor 150b may also include a pixel array to generate an image of the reflected pattern. Based on the images of the reflected pattern from sensors 150a and 150b, the system can determine a gaze point of the user and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b include the same sensor devices as image sensors 120a-120d of FIGS. 1A and 1B, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate in an environment with low light intensity.

Figure 2:
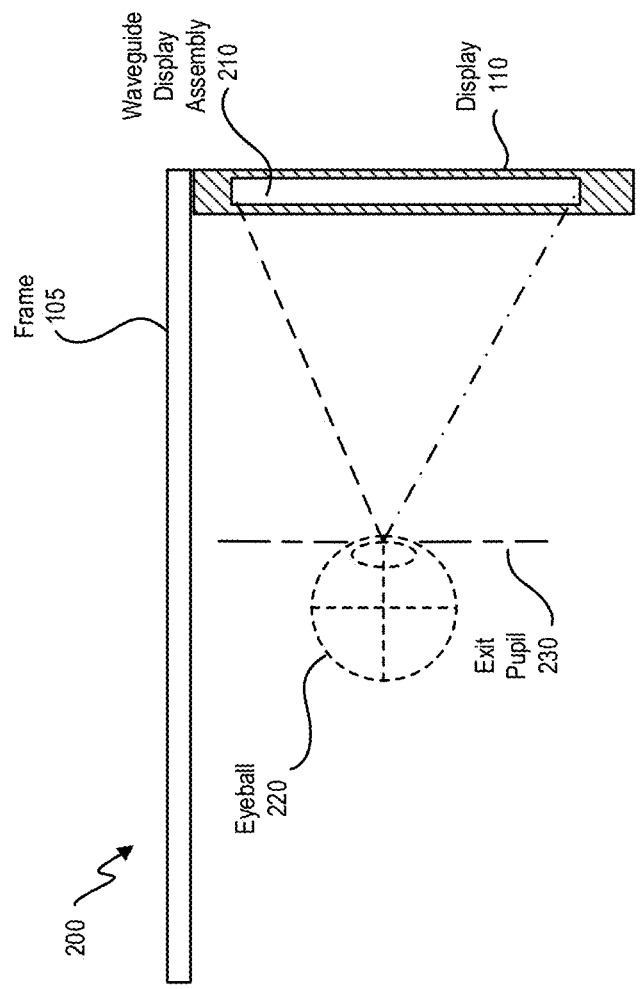
FIG. 2 is an embodiment of a cross sectional side view of the near-eye display.

FIG. 2 is an embodiment of a cross section 200 of the near-eye display 100 illustrated in FIGS. 1A-1D. Display 110 includes at least one waveguide display assembly 210. An exit pupil 230 is a location where a single eyeball 220 of the user is positioned in an eye box region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eye box located at exit pupil 230 and to eyeball 220. Waveguide display assembly 210 may be composed of one or more materials (e.g., plastic or glass) with one or more refractive indices. In some embodiments, the near-eye display 100 includes one or more optical elements between waveguide display assembly 210 and eyeball 220.

In some embodiments, waveguide display assembly 210 includes a stack of one or more waveguide displays including, but not limited to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
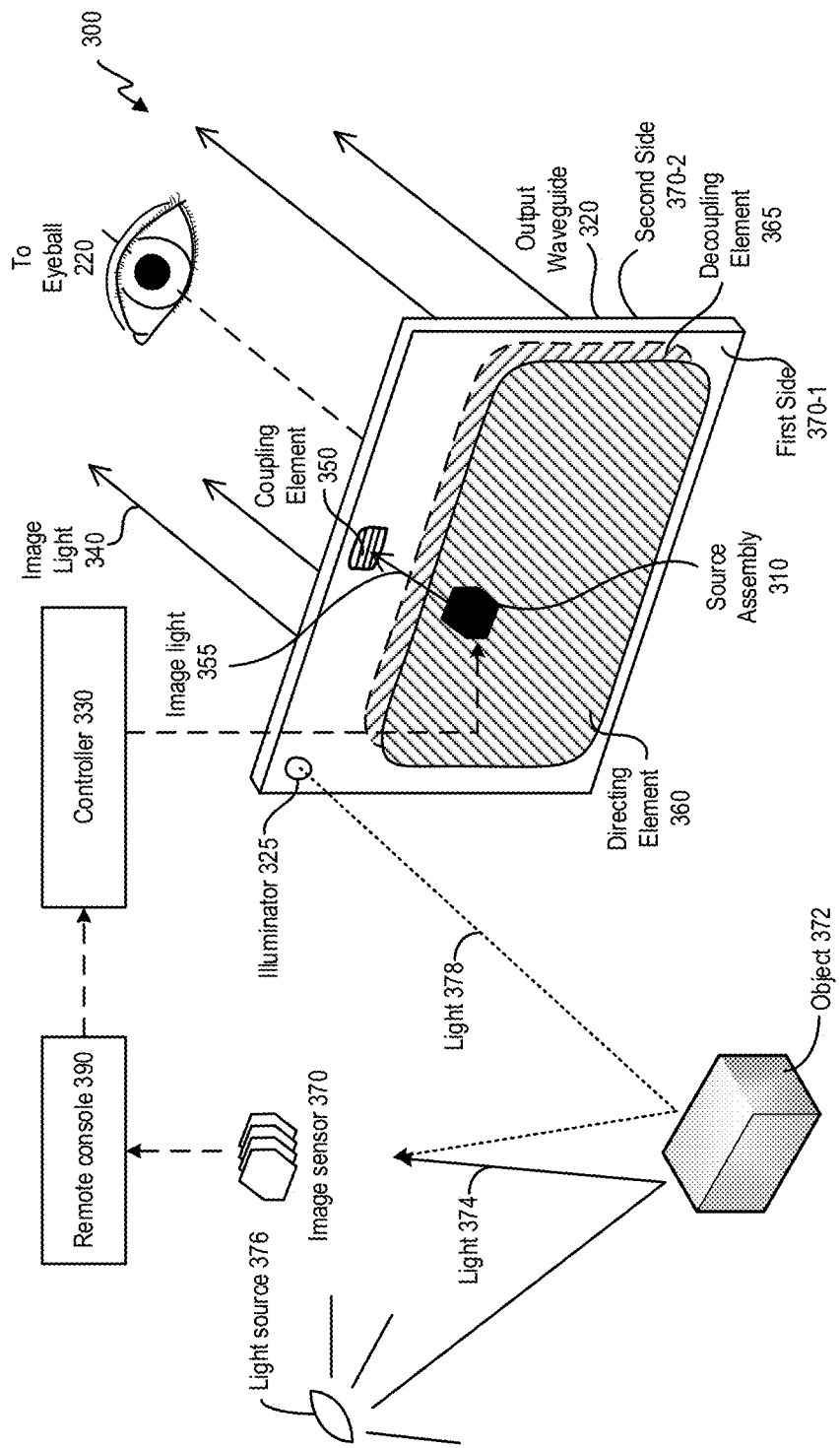
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display that is separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, for example, a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, for example, a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of, for example, silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eye box with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIGS. 1A and 1B to generate image data of a physical environment in front of the user (e.g., for location determination). Image sensor 150a and 150b may also be located on second side 370-2 and may include image sensors 150a and 150b of FIGS. 1C and 1D to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user or a gaze point of the user and determine the content of the images to be displayed to the user. The remote console can transmit instructions to controller 330 related to the determined content. Based on the instructions, controller 330 can control the generation and outputting of image light 355 by source assembly 310.

Figure 4:
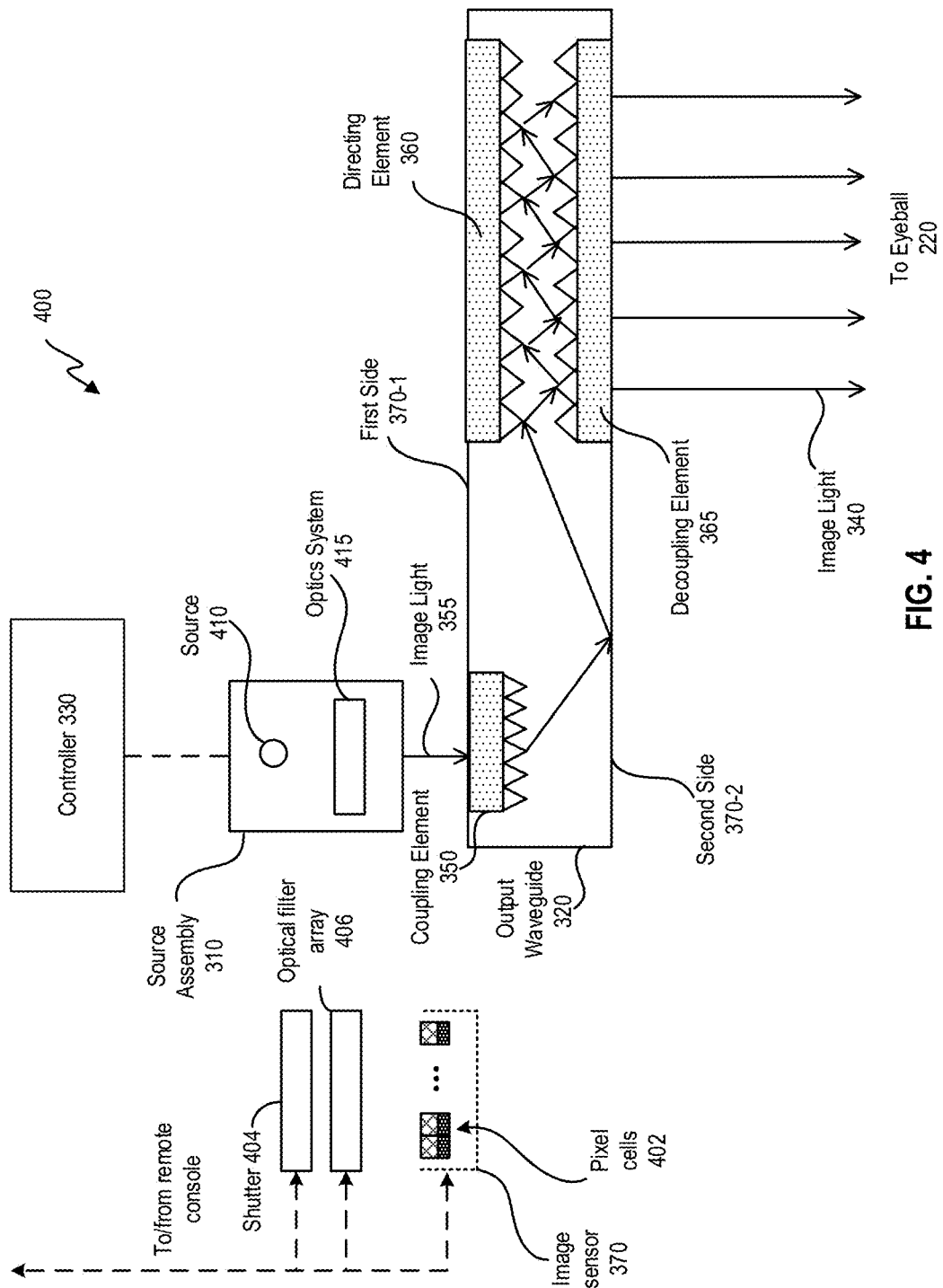
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter switch, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402 and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, for example, a laser diode, a vertical cavity surface emitting laser, and/or a light emitting diode.

Optics system 415 includes one or more optical components that condition the light from source 410. Conditioning light from source 410 may include, for example, expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is a diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
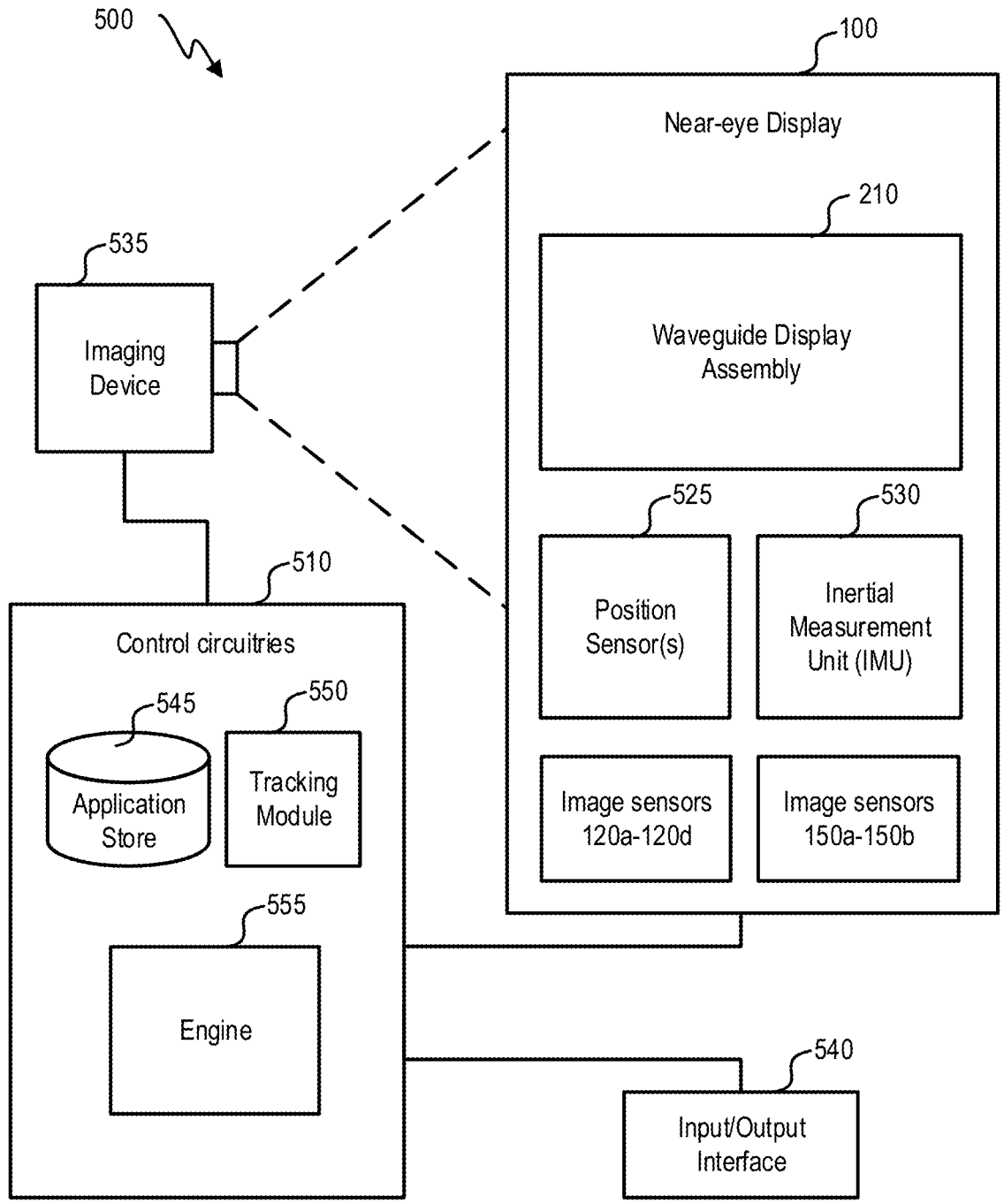
FIG. 5 is a block diagram of an embodiment of a system including the near-eye display.

FIG. 5 is a block diagram of an embodiment of a system 500 including the near-eye display 100. The system 500 includes near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIGS. 1A and 1B for generating image data of a physical environment in which the user is located, for performing location tracking of the user. Imaging device 535 may further include, for example, image sensors 150a-150b of FIGS. 1C and 1D for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
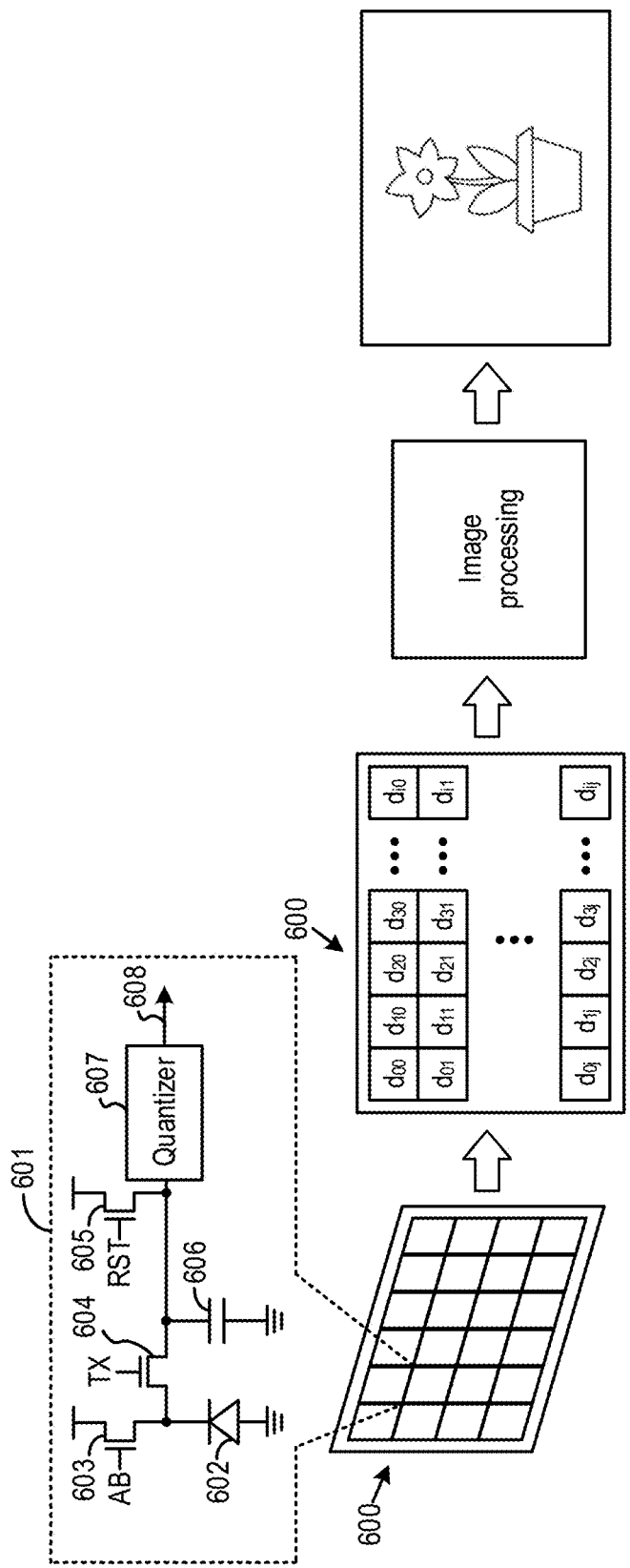
FIG. 6 illustrates an example of an image sensor and its operations.

FIG. 6 illustrates an example of an image sensor 600 and its operations. As shown in FIG. 6, image sensor 600 can include an array of pixel cells, including pixel cell 601, and can generate digital intensity data corresponding to pixels of an image. Pixel cell 601 may be part of pixel cells 402 of FIG. 4. As shown in FIG. 6, pixel cell 601 may include one or more photodiodes 602, an electronic shutter switch 603, a transfer switch 604, a reset switch 605, a charge storage device 606, and a quantizer 607. Quantizer 607 can be a pixel-level ADC that is accessible only by pixel cell 601. Photodiode 602 may include, for example, a P-N diode, a P-I-N diode, or a pinned diode, whereas charge storage device 606 can be a floating diffusion node of transfer switch 604. Photodiode 602 can generate and accumulate charge upon receiving light within an exposure period, and the quantity of charge generated within the exposure period can be proportional to the intensity of the light.

Figure 7A:
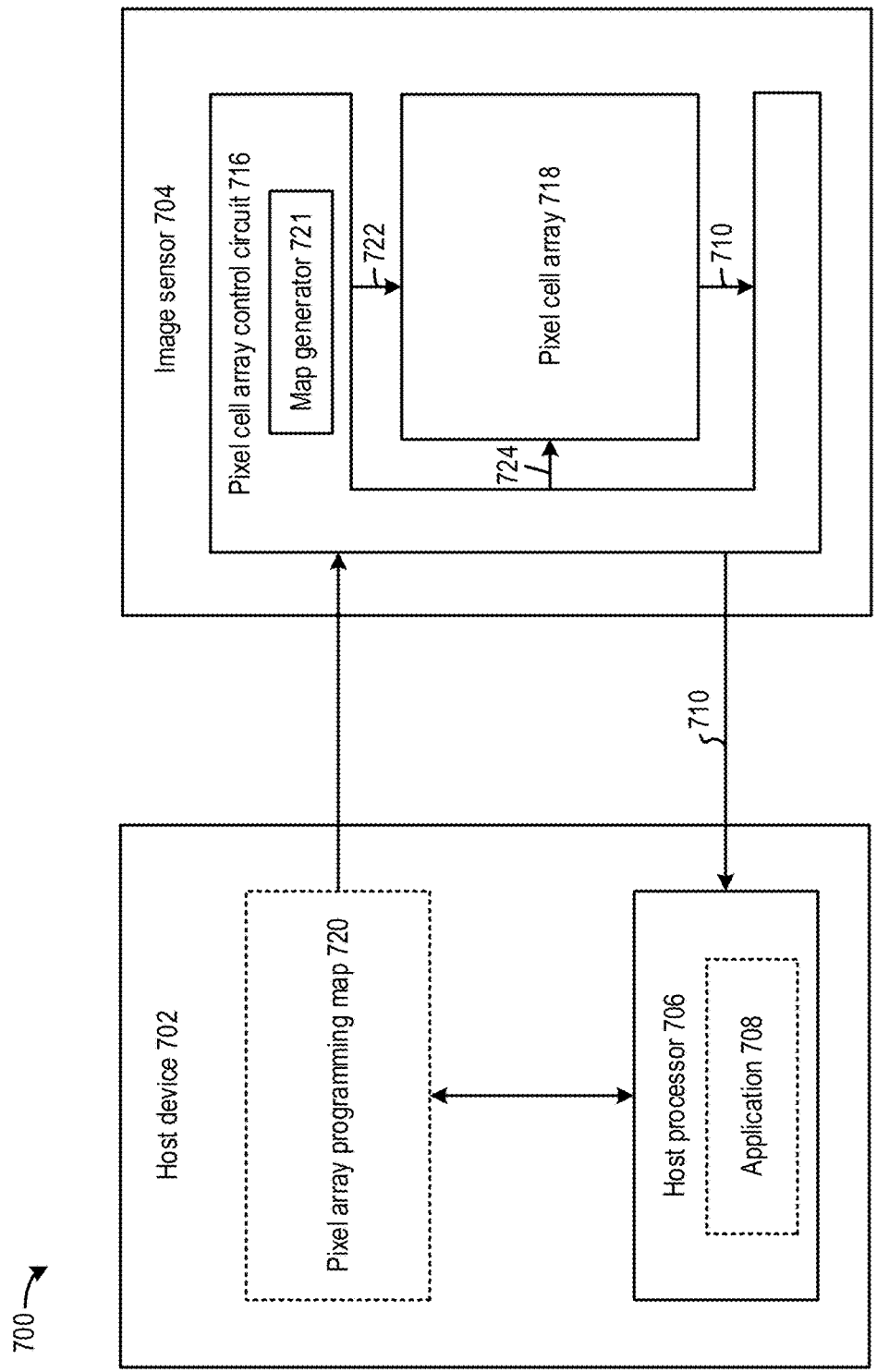
FIGS. 7A, 7B, and 7C illustrate examples of an image processing system and its operations.
Figure 7B:
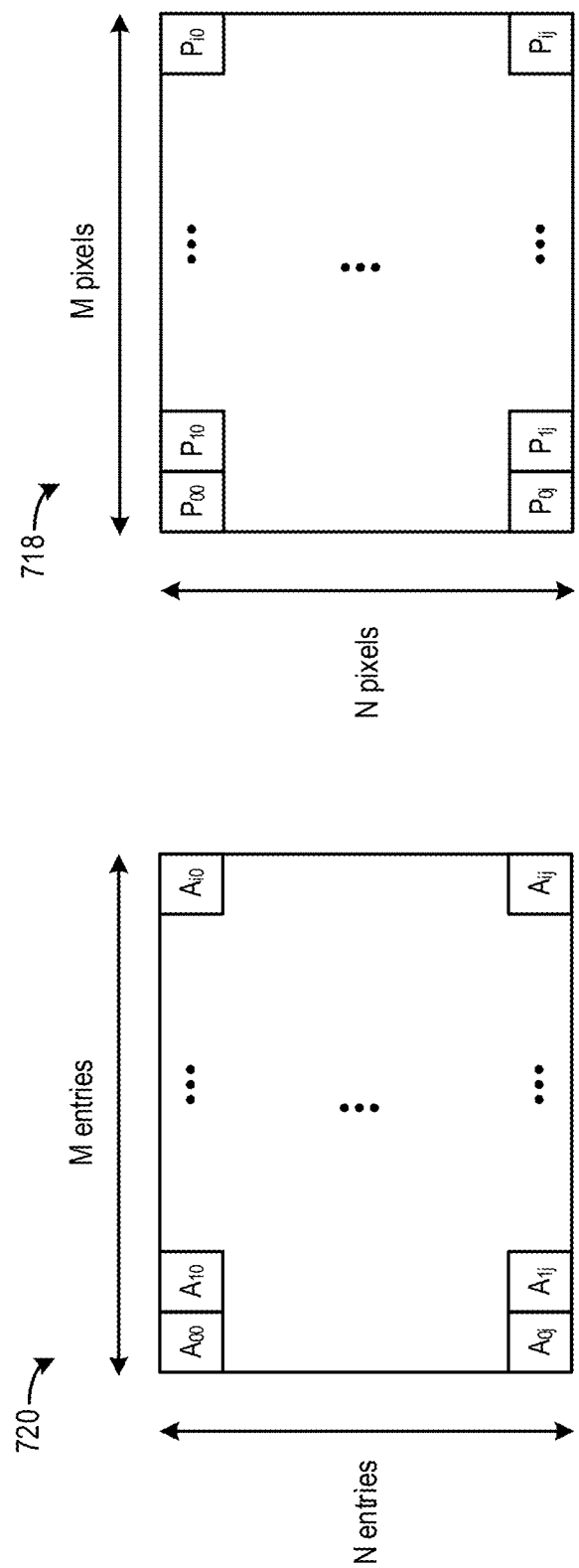
Figure 7C:
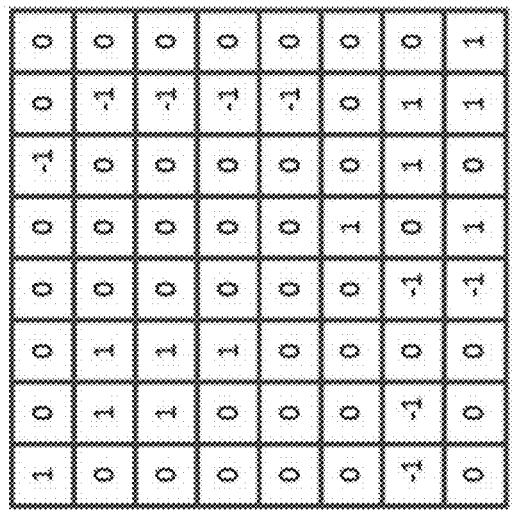
Figure 7C:
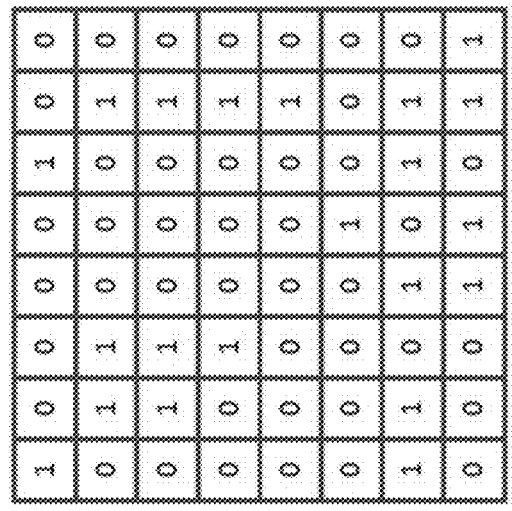

FIGS. 7A, 7B, and 7C illustrate examples of an image processing system 700 and its operations. Image processing system 700 includes a host device 702 and an image sensor 704. Host device 702 can include a host processor 706 which operates an application 708 which can perform operations including, for example, fusion of two-dimensional (2D) and three-dimensional (3D) sensing, object recognition and tracking, or location tracking, on an image 710 generated by image sensor 704. In some examples, image processing system 700 can be in a wearable device. In some examples, processing system 700 can be split into multiple separate devices. For example, host device 702 can be a personal computer (PC), a smart phone, a camera base station, or an integrated circuit such as a central processing unit (CPU), a field-programmable switch array (FPGA), or a micro controller unit (MCU). Host device 702 and image sensor 704 can be electrically connected via an interconnect (not shown in FIG. 7A), such as an interconnect compatible with the Mobile Industry Processor Interface (MIPI) standard.

Referring to FIG. 7A, image sensor 704 includes a pixel cell array control circuit 716 and a pixel cell array 718. Each pixel cell of pixel cell array 718 can include similar components as pixel cell 601 of FIG. 6 such as photodiode 602, electronic shutter switch 603, and transfer switch 604, to perform a light measurement operation to generate pixel data. In some examples, pixel cell array 718 and pixel cell array control circuit 716 can form a stack structure to maximize the light receiving surface of image sensor 704, which allows pixel cell array 718 to include more pixel cells to improve resolution.

Each pixel cell in pixel cell array 718 may include a configuration memory, which can be part of or external to the pixel cell, to store programming data for configuring/programming the light measurement operation at each pixel cell, or at blocks of pixel cells. The configuration memory of each pixel cell can be individually addressable, which allows the light measurement operation at each pixel cell, or a block of pixel cells, to be individually programmed by pixel cell array control circuit 716 based on a pixel array programming map 720. In some examples, pixel array programming map 720 can be generated by host processor 706 as a result of the object tracking operation on the image 710. In some examples, pixel cell array control circuit 716 may also include a programming map generator 721 to generate pixel array programming map 720 based on image 710. Pixel cell array control circuit 716 can extract programming data from pixel array programming map 720 and transmit the programming data in the form of control signals 722 and 724 to pixel cell array 718. Programming data can be read out from the configuration memory to configure the light measurement operation.

As to be described in greater detail below, the configuration of the light measurement operation at a pixel cell can include, for example, setting a power state of the different circuit components accessed/associated by the pixel cell, such as quantization circuit 620. The configuration may also include other aspects of the light measurement operation, such as setting an exposure period for the light measurement operation or setting the quantization resolution/bit depth.

Pixel array programming map 720 can include programming data targeted at each pixel cell of the array of pixel cells. FIG. 7B illustrates an example of pixel array programming map 720. As shown in FIG. 7B, pixel array programming map 720 can be include a 2D array of programming data, with each entry of programming data of the two-dimensional array targeted at a pixel cell of pixel cell array 718. For example, in a case where pixel cell array 718 has a width of M pixels (e.g., M columns of pixels) and a height of N pixels (e.g., N rows of pixels), pixel array programming map 720 also has a width of M entries (e.g., M columns of entries) and a height of N entries (e.g., N rows of entries). The programming data $A_{00}$ at entry (0, 0) of pixel array programming map 720 is targeted at pixel cell $P_{00}$ at pixel location (0, 0) of pixel cell array 718, whereas the programming data $A_{01}$ at entry (0, 1) of pixel array programming map 720 is targeted at pixel cell $P_{01}$ at pixel location (0, 1) of pixel cell array 718. In some examples, the programming data of each entry of pixel array programming map 720 can be transmitted sequentially following a pre-determined scanning pattern, such as traversing a row from left to right (e.g., $A_{00}$, $A_{01}$, . . . $A_{0i}$), followed by the next row from left to right (e.g., $A_{10}$, $A_{11}$, . . . $A_{1i}$), to form a stream of serial data. The programming data for each entry can be extracted and identified from the stream of serial data based on the scanning pattern and the order by which the entries are received. In some examples, pixel array programming map 720 can be sent only when certain programming data need to be updated between frames, and only the programming data that need to be updated are included in pixel array programming map 720. In some examples, each entry of pixel array programming map 720 can also target at a block of pixel cells (e.g., a 2×2 array of pixel cells, a 4×4 array of pixel cells).

Depending on the configuration operation, each entry of pixel array programming map 720 can either include binary programming data or non-binary programming data. FIG. 7C illustrates examples of pixel array programming maps 720a and 720b. As shown in FIG. 7C, pixel array programming map 720a includes binary programming data 0 and 1. In some examples, the binary programming data at each entry of pixel array programming map 720a can enable (e.g., with programming data set to 1) or disable (e.g., with programming data set to 0) the generation of pixel data at the pixel cell corresponding to the entry. The binary programming data can also set a power state of the quantization circuit 620 used by the pixel cell. For example, if the programming data indicates that the pixel cell is not to generate pixel data, the processing circuits and memory included in the quantization circuit used by the pixel cell can be powered down.

In addition, pixel array programming map 720b may include non-binary programming data such as −1, 0, 1, or other values. The non-binary programming data of pixel array programming map 720b, as shown in FIG. 7C, can be used to, for example, set an exposure period or set a quantization resolution. For example, a programming value of −1 can indicate the pixel cell and the quantization circuit being disabled during a frame period, a programming value of 0 can indicate the pixel cell and the quantization circuit operating in a low-resolution mode, whereas a programming value 1 can indicate the pixel cell and the quantization circuit operating in the full resolution mode. The pixel cell can then set the power state of the processing circuits and the memory of the quantization circuit accordingly.

Figure 8A:
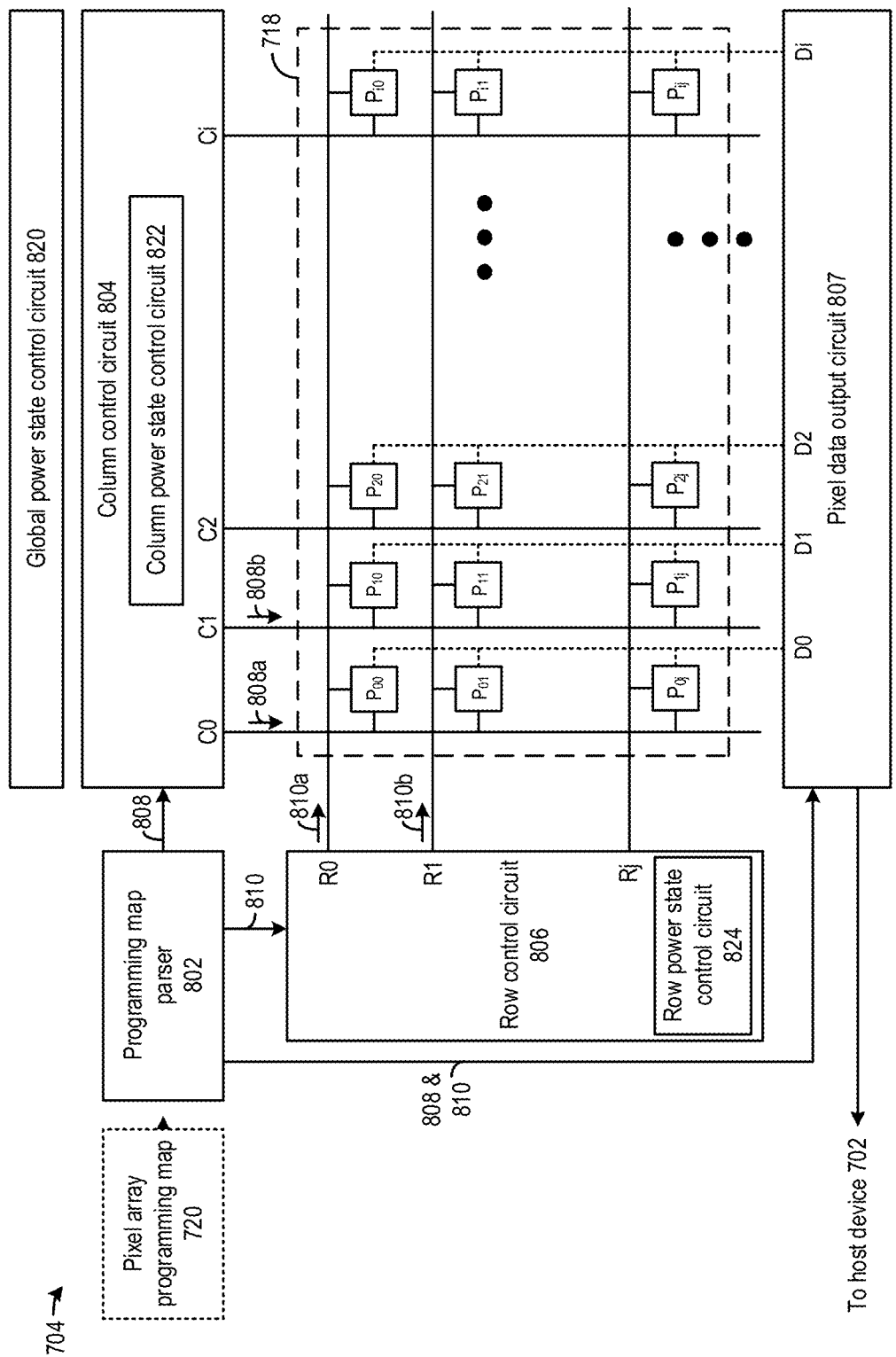
FIGS. 8A, 8B, and 8C illustrate examples components of the image processing system of FIGS. 7A-7C.
Figure 8B:
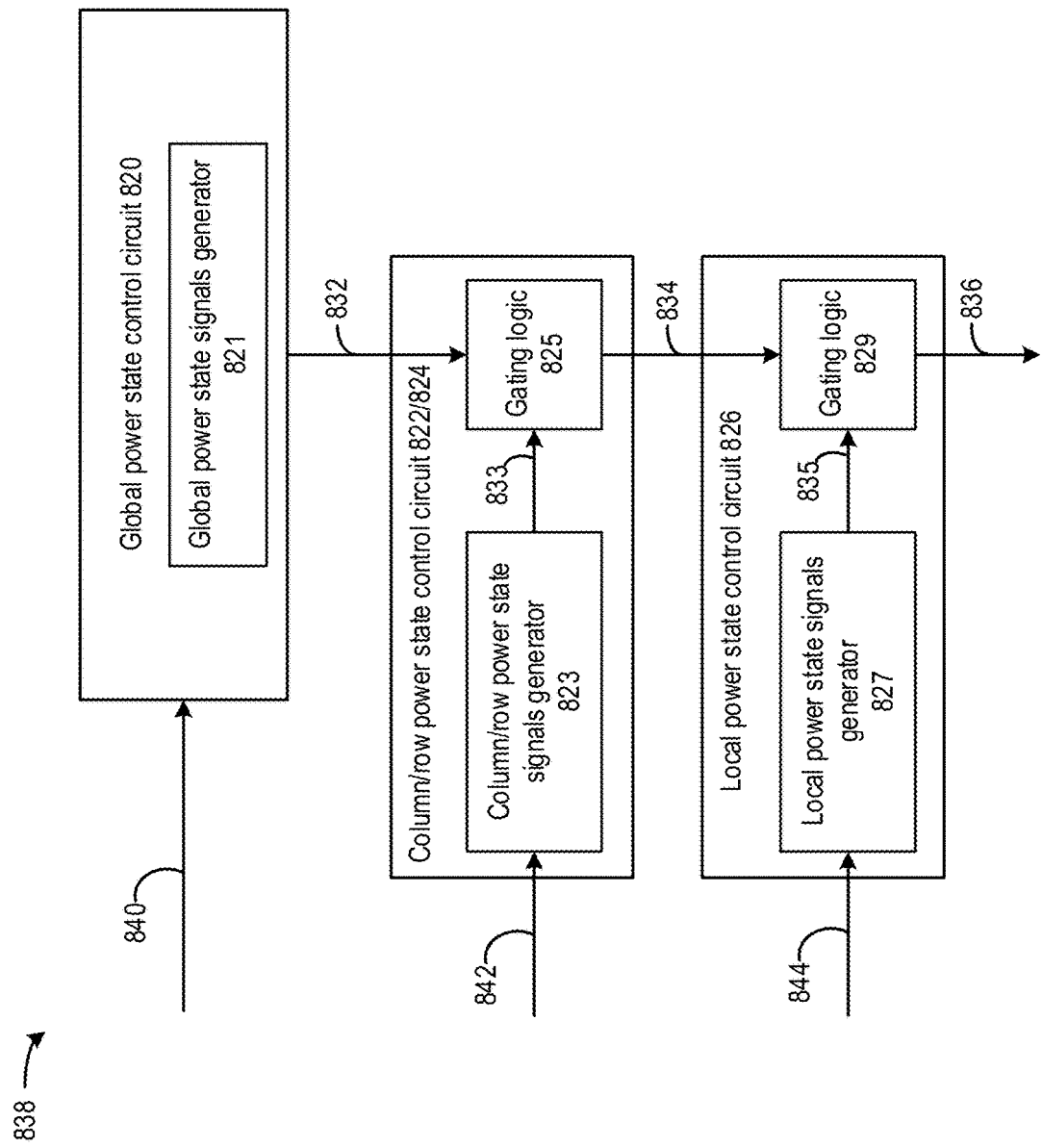
Figure 8C:
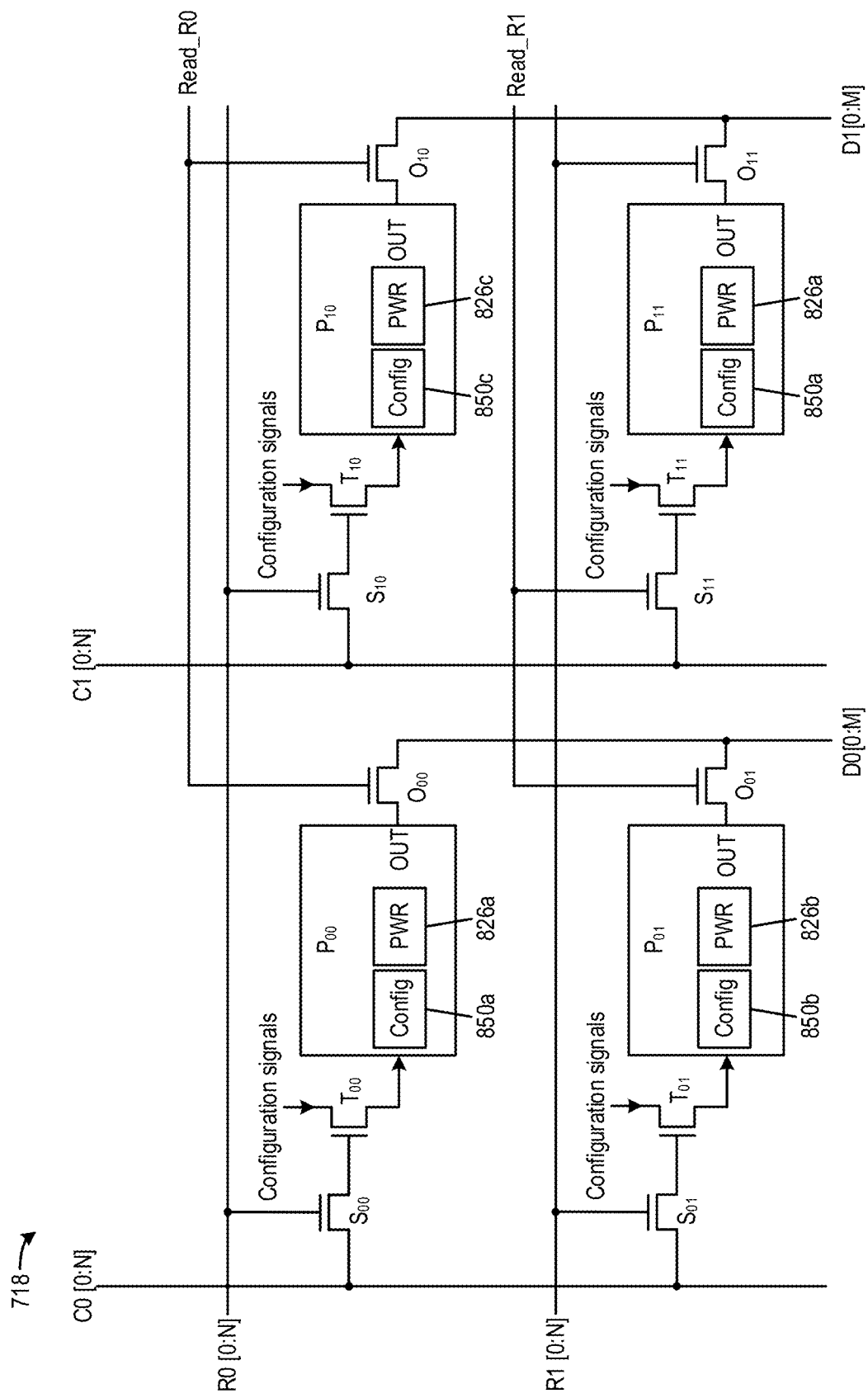

FIGS. 8A, 8B, and 8C illustrate example components of pixel cell array control circuit 716 and pixel cell array 718 of image sensor 704. As shown in FIG. 8A, pixel cell array control circuit 716 can include a programming map parser 802, a column control circuit 804, a row control circuit 806, and a pixel data output circuit 807. Programming map parser 802 can parse pixel array programming map 720, which can be in a serial data stream, to identify the programming data for each pixel cell (or block of pixel cells). The identification of the programming data can be based on, for example, a pre-determined scanning pattern by which the two-dimensional pixel array programming map is converted into the serial format, as well as the order by which the programming data is received by programming map parser 802 from the serial data stream. Programming map parser 802 can create a mapping among the row addresses of the pixel cells, the column addresses of the pixel cells, and one or more configuration signals based on the programming data targeted at the pixel cells. Based on the mapping, programming map parser 802 can transmit control signals 808 including the column addresses and the configuration signals to column control circuit 804, as well as control signals 810 including the row addresses mapped to the column addresses and the configuration signals to row control circuit 806. In some examples, the configuration signals can also be split between control signals 808 and control signals 810 or sent as part of control signals 810 to row control circuit 806.

Column control circuit 804 and row control circuit 806 are configured to forward the configuration signals received from programming map parser 802 to the configuration memory of each pixel cell of pixel cell array 718. In FIG. 8A, each box labelled $P_{ij}$ (e.g., $P_{00}$, $P_{01}$, $P_{10}$, $P_{11}$) can represent a pixel cell or a block of pixel cells (e.g., a 2×2 array of pixel cells, a 4×4 array of pixel cells) and can include or can be associated with a quantization circuit. As shown in FIG. 8A, column control circuit 804 drives a plurality of sets of column buses C0, C1, . . . Ci. Each set of column buses includes one or more buses and can be used to transmit control signals 722 of FIG. 7A, which can include a column selection signal and/or other configuration signals, to a column of pixel cells. For example, column bus(es) C0 can transmit a column selection signal 808a to select a column of pixel cells (or a column of blocks of pixel cells) $p_{00}$, $p_{01}$, . . . $p_{0j}$, column bus(es) C1 can transmit a column selection signal 808b to select a column of pixel cells (or blocks of pixel cells) $p_{10}$, $p_{11}$, . . . $p_{1j}$, etc.

Further, row control circuit 806 drives a plurality of sets of row buses labelled R0, R1, . . . Rj. Each set of row buses also includes one or more buses and can be used to transmit control signals 724 of FIG. 7A, which can include a row selection signal and/or other configuration signals, to a row of pixel cells, or a row of blocks of pixel cells. For example, row bus(es) R0 can transmit a row selection signal 810a to select a row of pixel cells (or blocks of pixel cells) $p_{00}$, $p_{10}$, . . . $p_{i0}$, row bus(es) R1 can transmit a row selection signal 810b to select a row of pixel cells (or blocks of pixel cells) $p_{01}$, $p_{11}$, . . . $p_{1j}$, etc. Any pixel cell (or block of pixel cells) within pixel cell array 718 can be selected based on a combination of the row selection signal and the column signal to receive the configuration signals. The row selection signals, column selection signals, and the configuration signals (if any) are synchronized based on control signals 808 and 810 from programming map parser 802, as described above. Each column of pixel cells can share a set of output buses to transmit pixel data to pixel data output module 807. For example, column of pixel cells (or blocks of pixel cells) $p_{00}p_{01}$, . . . $p_{0j}$ can share output buses $D_0$, column of pixel cells (or blocks of pixel cells) $p_{10}$, $p_{11}$, . . . $p_{1j}$, can share output buses $D_1$, etc.

Pixel data output module 807 can receive the pixel data from the buses, convert the pixel data into one or more serial data streams (e.g., using a shift register), and transmit the data streams to host device 702 under a pre-determined protocol such as MIPI. The data stream can come from a quantization circuit associated with each pixel cell (or block of pixel cells) as part of a sparse image frame. In addition, pixel data output module 807 can also receive control signals 808 and 810 from programming map parser 802 to determine, for example, which pixel cell does not output pixel data or the bit width of pixel data output by each pixel cell, and then adjust the generation of serial data streams accordingly. For example, pixel data output module 807 can control the shift register to skip a number of bits in generating the serial data streams to account for, for example, variable bit widths of output pixel data among the pixel cells or the disabling of pixel data output at certain pixel cells.

In addition, pixel cell array control circuit 716 further includes a global power state control circuit 820, a column power state control circuit 822, a row power state control circuit 824, and a local power state control circuit 826 at each pixel cell or each block of pixel cells (not shown in FIG. 8A) forming hierarchical power state control circuits. Global power state control circuit 820 can be of the highest level in the hierarchy, followed by row/column power state control circuit 822/824, with local power state control circuit 826 at the lowest level in the hierarchy.

The hierarchical power state control circuits can provide different granularities in controlling the power state of image sensor 704. For example, global power state control circuit 820 can control a global power state of all circuits of image sensor 704, including processing circuits and memory of all pixel cells, DAC, counter, etc. Row power state control circuit 822 can control the power state of processing circuits and memory of each row of pixel cells (or blocks of pixel cells) separately, whereas column power state control circuit 824 can control the power state of processing circuits and memory of each column of pixel cells (or blocks of pixel cells) separately. Some examples may include row power state control circuit 822 but not column power state control circuit 824, or vice versa. In addition, local power state control circuit 826 can be part of a pixel cell or a block of pixel cells and can control the power state of processing circuits and memory of the pixel cell or the block of pixel cells.

FIG. 8B illustrates examples of internal components of hierarchical power state control circuits and their operations. Specifically, global power state control circuit 820 can output a global power state signal 832, which can be in the form of a bias voltage, a bias current, a supply voltage, or programming data, that sets a global power state of image sensor 704. Moreover, column power state control circuit 822 (or row power state control circuit 824) can output a column/row power state signal 834 that sets a power state of a column/row of pixel cells (or blocks of pixel cells) of image sensor 704. Column/row power state signal 834 can be transmitted as row signals 810 and column signals 808 to the pixel cells. Further, local power state control circuit 826 can output a local power state signal 836 that sets a power state of the pixel cell (or a block of pixel cells), including the associated processing circuits and memory. Local power state signal 836 can be output to processing circuits and memory of the pixel cells to control their power state.

In hierarchical power state control circuits 838, an upper-level power state signal can set an upper bound for a lower-level power state signal. For example, global power state signal 832 can be an upper-level power state signal for column/row power state signal 834 and set an upper bound for column/row power state signal 834. Moreover, column/row power state signal 834 can be an upper-level power state signal for local power state signal 836 and set an upper bound for local power state signal 836. For example, if global power state signal 832 indicates a low power state, column/row power state signal 834 and local power state signal 836 may also indicate a low power state.

Each of global power state control circuit 820, column/row power state control circuit 822/824, and local power state control circuit 826 can include a power state signal generator, whereas column/row power state control circuit 822/824, and local power state control circuit 826 can include a gating logic to enforce the upper bound imposed by an upper-level power state signal. Specifically, global power state control circuit 820 can include a global power state signals generator 821 to generate global power state signal 832. Global power state signals generator 821 can generate global power state signal 832 based on, for example, an external configuration signal 840 (e.g., from host device 702) or a pre-determined temporal sequences of global power states.

In addition, column/row power state control circuit 822/824 can include a column/row power state signals generator 823 and a gating logic 825. Column/row power state signals generator 823 can generate an intermediate a column/row power state signal 833 based on, for example, an external configuration signal 842 (e.g., from host device 702) or a predetermined temporal sequences of row/column power states. Gating logic 825 can select one of global power state signal 832 or intermediate column/row power state signal 833 representing the lower power state as column/row power state signal 834.

Further, local power state control circuit 826 can include a local power state signals generator 827 and a gating logic 829. Low power state signals generator 827 an intermediate local power state signal 835 based on, for example, an external configuration signal 844, which can be from a pixel array programming map, a pre-determined temporal sequences of row/column power states, etc. Gating logic 829 can select one of intermediate local power state signal 835 or column/row power state signal 834 representing the lower power state as local power state signal 836.

FIG. 8C illustrates additional details of pixel cell array 718, including local power state control circuit 826 (e.g., 826a, 826b, 826c, and 826d, labelled as "PWR" in FIG. 8C) and configuration memory 850 (e.g., 850a, 850b, 850c, and 850d, labelled as "Config" in FIG. 8C) of each pixel cell (or each block of pixel cells). Configuration memory 850 can store first programming data to control a light measurement operation (e.g., exposure period duration or quantization resolution) of a pixel cell (or a block of pixel cells). In addition, configuration memory 850 can also store second programming data that can be used by local power state control circuit 826 to set the power states of processing circuits and memory. Configuration memory 850 can be implemented as a static random-access memory (SRAM). Although FIG. 8C shows that local power state control circuit 826 and configuration memory 850 are internal to each pixel cell, it is understood that configuration memory 850 can also be external to each pixel cell, such as when local power state control circuit 826 and configuration memory 850 are for a block of pixel cells.

As shown in FIG. 8C, the configuration memory 850 of each pixel cell is coupled with column buses C and row buses R via transistors S, such as $S_{00}S_{10}$, $S_{10}$, $S_{11}$, etc. In some examples, each set of column buses (e.g., C0 and C1) and row buses (e.g., R0 and R1) can include multiple bits. For example, in FIG. 8C, each set of column buses and row buses can carry N+1 bits. It is understood that in some examples each set of column buses and row buses can also carry a single data bit. Each pixel cell is also electrically connected with transistors T, such as $T_{00}$, $T_{10}$, $T_{10}$, or $T_{11}$, to control the transmission of configuration signals to the pixel cell (or block of pixel cells). Transistor S of each pixel cell can be driven by the row and column select signals to enable (or disable) the corresponding transistors T to transmit configuration signals to the pixel cell. In some examples, column control circuit 804 and row control circuit 806 can be programmed by a single write instruction (e.g., from host device 702) to write to configuration memory 850 of multiple pixel cells simultaneously. Column control circuit 804 and row control circuit 806 can then control the row buses and column buses to write to the configuration memory of the pixel cells.

In some examples, local power state control circuit 826 can also receive configuration signal directly from transistors T without storing the configuration signals in configuration memory 850. For example, as described above, local power state control circuit 826 can receive row/column power state signal 834, which can be an analog signal such as a voltage bias signal or a supply voltage, to control the power state of the pixel cell and the processing circuits and/or memory used by the pixel cell.

In addition, each pixel cell also includes transistors O, such as $O_{00}$, $O_{10}$, $O_{10}$, or $O_{11}$, to control the sharing of the output bus D among a column of pixel cells. The transistors O of each row can be controlled by a read signal (e.g., read_R0, read_R1) to enable a row-by-row read out of the pixel data, such that one row of pixel cells output pixel data through output buses D0, D1, . . . Di, followed by the next row of pixel cells.

In some examples, the circuit components of pixel cell array 718, including processing circuits and memory, counter, DAC, buffer network including buffers, etc., can be organized into a hierarchical power domain managed by hierarchical power state control circuits 838. The hierarchical power domain may include a hierarchy of multiple power domains and power sub-domains. The hierarchical power state control circuits can individually set a power state of each power domain, and each power sub-domain under each power domain. Such arrangements allow fine grain control of the power consumption by image sensor 704 and support various spatial and temporal power state control operations to further improve the power efficiency of image sensor 704.

While some of the pixel-level or block-level ADCs are disabled, high speed control signals, such as clocks, analog ramp signals, or digital ramp signals, may still be transmitted to each pixel-level or block-level ADCs via buffer network, which can consume a substantial amount of power and increase the average power consumption for generation of each pixel. The inefficiency can be further exacerbated when the sparsity of the image frame increases (e.g., containing fewer pixels), but the high-speed control signals are still transmitted to each pixel cell, such that the power consumption in transmitting the high-speed control signals remains the same and the average power consumption for generation of each pixel increases due to fewer pixels being generated.

Figure 9:
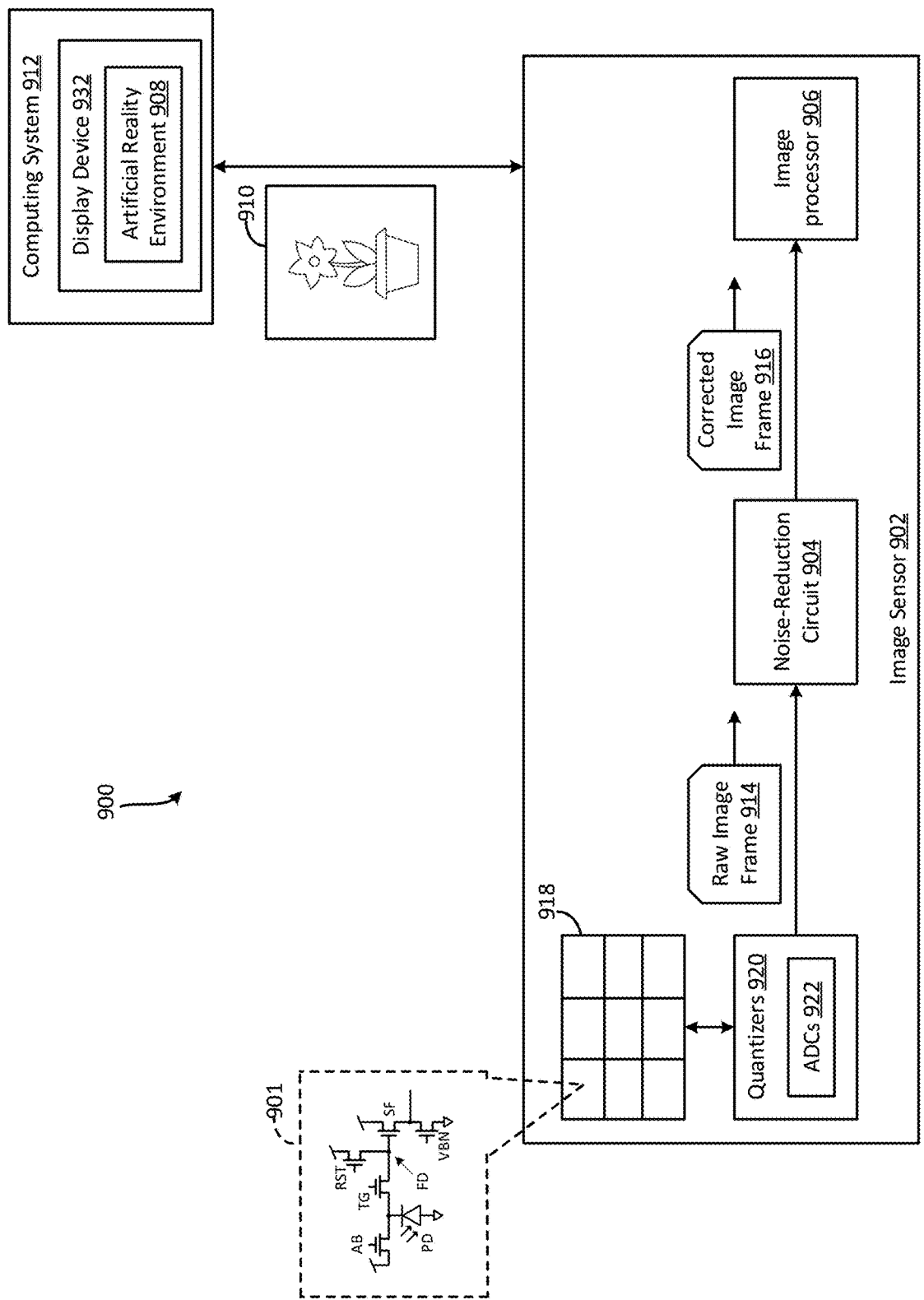
FIG. 9 shows an example of a system that includes an image sensor with a noise-reduction circuit according to some aspects of the present disclosure.

FIG. 9 shows an example of a system 900 that includes an image sensor 902 with a noise-reduction circuit 904 according to some aspects of the present disclosure. In some examples, the image sensor 902 can correspond to any of the image sensors described above with respect to FIGS. 1-8, such as image sensors 120a-d, 150a-b, 600, and 704.

The image sensor 902 can include an array of pixel cells 918, such as pixel cell 901, for use in generating digital intensity data corresponding to digital pixels of an image. A pixel cell 901 may include one or more photodiodes (PD), an anti-blooming gate (AB) that can prevent charge from the photodiode from overflowing to node FD when FD is holding a signal for ADC conversion, a transfer gate (TG) for transferring charge from PD to FD, a reset gate (RST) to reset the voltage at FD to a higher level, a source follower (SF) that may act as a unity gain buffer, and/or a bias transistor (VBN) that can provide bias current to SF. A photodiode may include, for example, a P-N diode, a P-I-N diode, or a pinned diode. The photodiode can generate and accumulate charge upon receiving light within an exposure period, and the quantity of charge generated within the exposure period can be proportional to the intensity of the light. In some examples, the exposure period can be defined based on the timing of the AB signal.

The pixel array 918 can be coupled to one or more quantizers 920, which include analog-to-digital converters (ADCs) 922. Each quantizer can include a capacitor coupled to an analog-to-digital converter. In some examples, each pixel cell may be coupled to its own quantizer. For example, each quantizer may be a pixel-level quantizer that is only accessible to an individual pixel cell. In other examples, a single quantizer may be accessible by multiple pixel cells. The quantizers 920 can convert the electric charges from the pixel cells into digital values that represent a raw image frame 914. The raw image frame 914 may include noise, such as fixed pattern noise and temporal noise. The noise may result from manufacturing inconsistencies in the ADCs 922 or may arise for other reasons. Some examples of the present disclosure can include a noise-reduction circuit 904 to help reduce (e.g., remove) this noise.

The noise-reduction circuit 904 can be coupled to the quantizers 920. The noise-reduction circuit 904 can receive the raw image frame 914 and apply a reference frame to the raw image frame 914 to generate a corrected image frame 916. For example, the noise-reduction circuit 904 can subtract the reference frame from the raw image frame 914 to generate a corrected image frame 916. The corrected image frame 916 may have less noise than the raw image frame 914 as a result of this noise correction process. The noise-reduction circuit 904 can then transmit the corrected image frame 916 to an image processor 906.

The image processor 906 can be coupled to the noise-reduction circuit 904. The image processor 906 can receive the corrected image frame 916 and perform one or more image processing operations on the corrected image frame 916 to generate an output digital image 910. Examples of the image processing operations can include filtering, feature extraction, and cropping. The image processor 906 can then transmit the digital image 910 to a computing system 912, which may include the image sensor 902 or may be separate from the image sensor 902. The image processor 906 can transmit the corrected image frame 916 to the computing system 912 in any suitable manner, for example via a wireless or wired connection.

The computing system 912 can include one computing device or multiple computing devices configured to perform operations using the digital image 910. Examples of such computing devices can include laptop computers, desktop computers, servers, mobile phones, tablets, e-readers, and wearable devices such as a smart watch or headset. The computing system 912 may be, for example, a viewing system for viewing the digital image 910, a processing system for interpreting the digital image 910, or a compilation system for compiling a set of digital images. In some examples, the computing system 912 may be an artificial reality system. The artificial reality system can be configured to use the digital image 910 to generate an artificial reality environment 908. The artificial reality environment 908 may be output on a display device 932, such as a liquid crystal display (LCD), light-emitting diode (LED) display, and/or head-mounted display.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, artificial reality may also be associated with applications, products, accessories, services, or some combination thereof, that are used to, for example, create content in an artificial reality and/or are otherwise used in (e.g., perform activities in) an artificial reality. An artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 10:
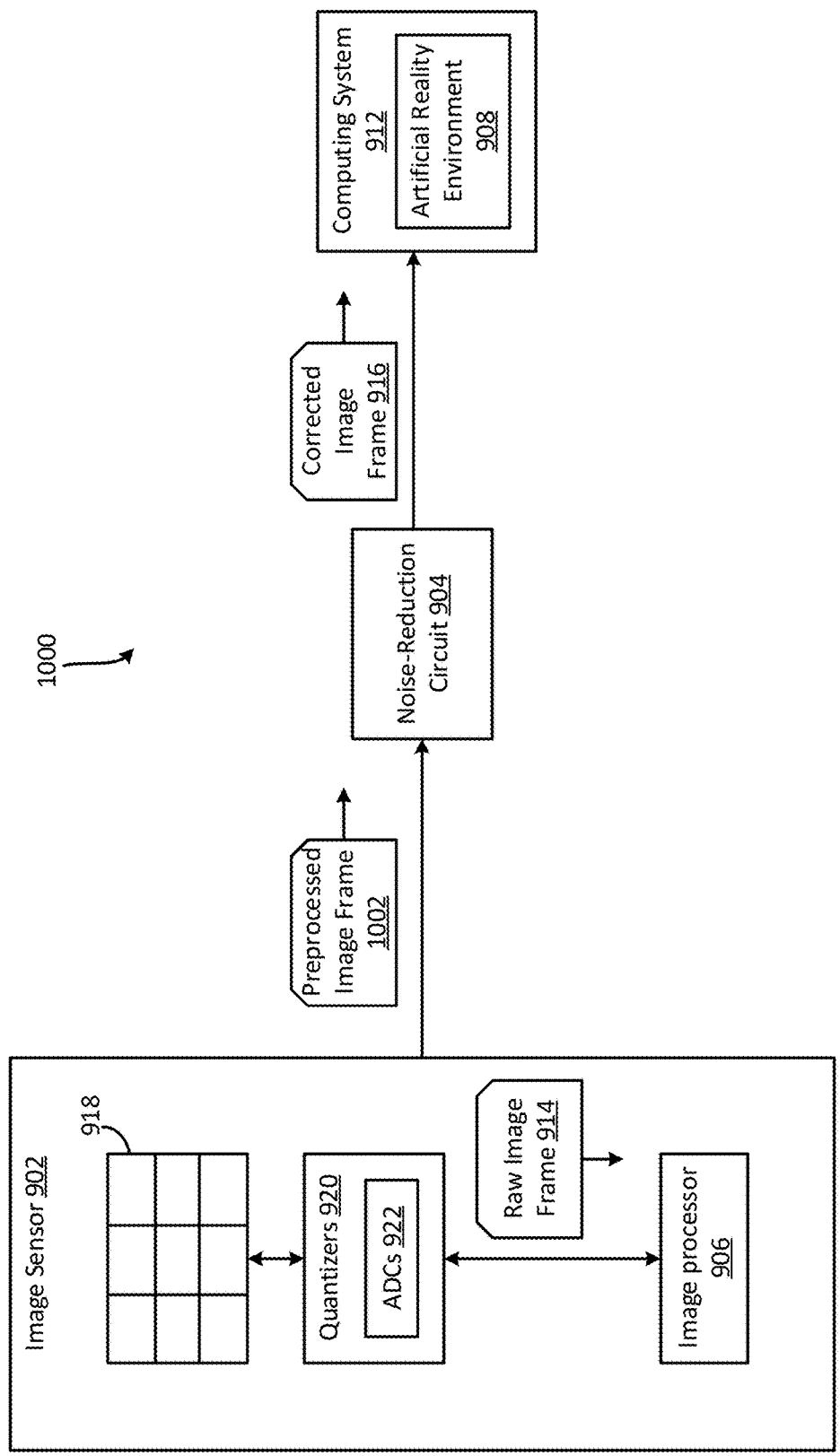
FIG. 10 shows an example of a system in which an image sensor is separate from a noise-reduction circuit according to some aspects of the present disclosure.

While FIG. 9 shows one particular arrangement of the image sensor 902 and the noise-reduction circuit 904, other arrangements are also possible and contemplated herein. For example, FIG. 10 shows a system 1000 in which the image sensor 902 is separate from the noise-reduction circuit 904. In this example, the image sensor 902 includes the pixel array 918, quantizers 920, and the image processor 906, but the image sensor 902 excludes the noise-reduction circuit 904.

As shown in FIG. 10, the quantizers 920 can generate a raw image frame 914 and transmit the raw image frame 914 to the image processor 906. The image processor 906 can perform one or more image processing operations on the raw image frame 914 to generate a preprocessed image frame 1002. The image sensor 902 can then transmit the preprocessed image frame 1002 to the noise-reduction circuit 904, which can be coupled to the image sensor 902 via a wireless or wired connection. The noise-reduction circuit 904 can generate a corrected image frame 916 by applying a reference frame to the preprocessed image frame 1002. After generating the corrected image frame 916, the noise-reduction circuit 904 can transmit the corrected image frame 916 to the computing system 912 for subsequent use. The noise-reduction circuit 904 can transmit the corrected image frame 916 to the computing system 912 in any suitable manner, such as via a wired or wireless connection.

Figure 11:
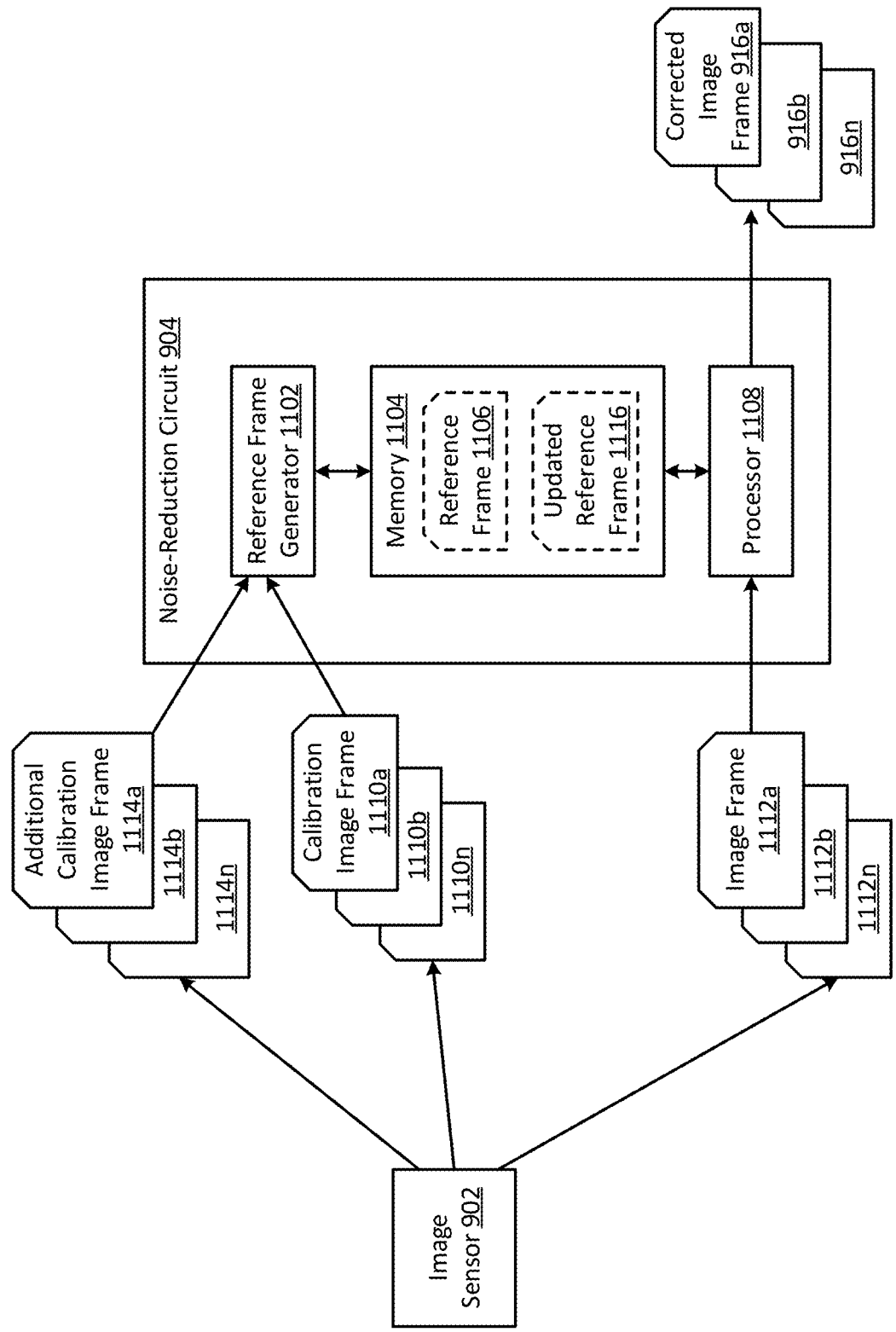
FIG. 11 shows an example of a noise-reduction circuit according to some aspects of the present disclosure.

One example of the noise-reduction circuit 904 is shown in FIG. 11. The noise-reduction circuit 904 can be capable of operating in three modes— a calibration mode, a noise-reduction mode, and a recalibration mode. Each of these modes is described below.

In the calibration mode, the noise-reduction circuit 904 can implement a calibration phase. During the calibration phase, the noise-reduction circuit 904 can acquire calibration image frames 1110*a-n* from the image sensor 902. When generating the calibration image frames 110*a-n*, the image sensor 902 can configure the pixel to not capture any photo-signals (e.g., by using a zero exposure time) while the quantizer operates normally. As a result, each calibration image frame 110*a-n* may only contain the noise components on top of a "dark" frame. The noise-reduction circuit 904 can acquire any number of calibration image frames 1110*a-n* that is greater than one. The noise-reduction circuit 904 can then operate a reference frame generator 1102 to generate a reference frame 1106 based on the calibration image frames 1110*a-n*. The reference frame generator 1102 can derive the reference frame 1106 from the calibration image frames 1110*a-n* using any number and combination of techniques. For example, the reference frame generator 1102 can average the calibration image frames 1110*a-n* to generate the reference frame 1106. This averaging process may be weighted or unweighted. This averaging approach can produce a reference frame 1106 in which the temporal noise is reduced, such that the reference frame 1106 primarily represents the fixed pattern noise. After generating the reference frame 1106, the reference frame generator 1102 can store the reference frame 1106 in memory 1104.

The memory 1104 can include one memory or multiple memories. The memory 1104 can be volatile memory or non-volatile memory. Examples of the memory 1104 include random access memory (RAM) such as static random access memory (SRAM); read-only memory (ROM) such as electrically erasable and programmable read-only memory (EEPROM); and flash memory. In some examples, the memory 1104 can correspond to any of the memories described above with respect to FIGS. 1-8, such as the configuration memory. The reference frame generator 1102 can store the reference frame 1106 in memory 1104. Storing the reference frame 1106 in memory 1104 may conclude the calibration phase.

After completing the calibration phase, the noise-reduction circuit 904 can switch to the noise-reduction mode to implement a noise-reduction phase. The noise-reduction phase may be considered a normal operation phase in which the noise-reduction circuit 904 implements its normal functionality of reducing noise in image frames 1112*a-n* received from the image sensor 902. During the noise-reduction phase, the noise-reduction circuit 904 can receive image frames 1112*a-n* (e.g., raw image frames 914 or preprocessed image frames 1002) from the image sensor 902. The noise-reduction circuit 904 can receive the image frames 1112*a-n* at a processor 1108. The processor 1108 can include one processor or multiple processors. Examples of the processor 1108 include a Field-Programmable Gate Array (FPGA), an application-specific integrated circuit (ASIC), or a microprocessor. In some examples, the processor 1108 can correspond to any of the processors described above with respect to FIGS. 1-8. The processor 1108 can also receive the reference frame 1106 from memory 1104. The processor 1108 can then apply the reference frame 1106 to the image frames 1112*a-n* to reduce noise in them, thereby generating corrected image frames 916*a-n*. For example, the processor 1108 can reduce noise in an image frame 1112*a* by subtracting the reference frame 1106 from the image frame 1112*a*, thereby generating a corrected image frame 916*a*. The noise-reduction circuit 904 may remain in the noise-reduction mode for the majority of its operation.

At some point in time, it may become desirable to recalibrate the noise-reduction circuit 904. For example, the pixel array in the image sensor 902 may be susceptible to degradation, environmental forces (e.g., temperature changes or physical impacts), and other factors that may impact the quality of the digital images generated by the image sensor 902. If the reference frame 1106 was generated prior to those factors impacting the image sensor 902, the noise-reduction circuit's 904 ability to adequately reduce noise in the image frames 1112*a-n* may decrease over time. To account for these changes, in some examples the noise-reduction circuit 904 can enter a recalibration mode in response to a triggering event.

In the recalibration mode, the noise-reduction circuit 904 can implement a recalibration phase. During the recalibration phase, the noise-reduction circuit 904 can update the reference frame 1106 based on one or more additional calibration image frames 1114*a-n* received from the image sensor 902. For example, the reference frame generator 1102 can receive the additional calibration image frames 1114*a-n* from the image sensor 902. The reference frame generator 1102 can also receive the existing reference frame 1106 from the memory 1104. The reference frame generator 1102 can then update the existing reference frame 1106 based on the additional calibration image frames 1114*a-n*. The reference frame generator 1102 can store the updated reference frame 1116 in memory 1104, for example by overwriting the existing reference frame 1106 with the updated reference frame 1116. Once the recalibration phase is complete, the noise-reduction circuit 904 can reenter the noise-reduction mode to continue with its normal operation.

Figure 12:
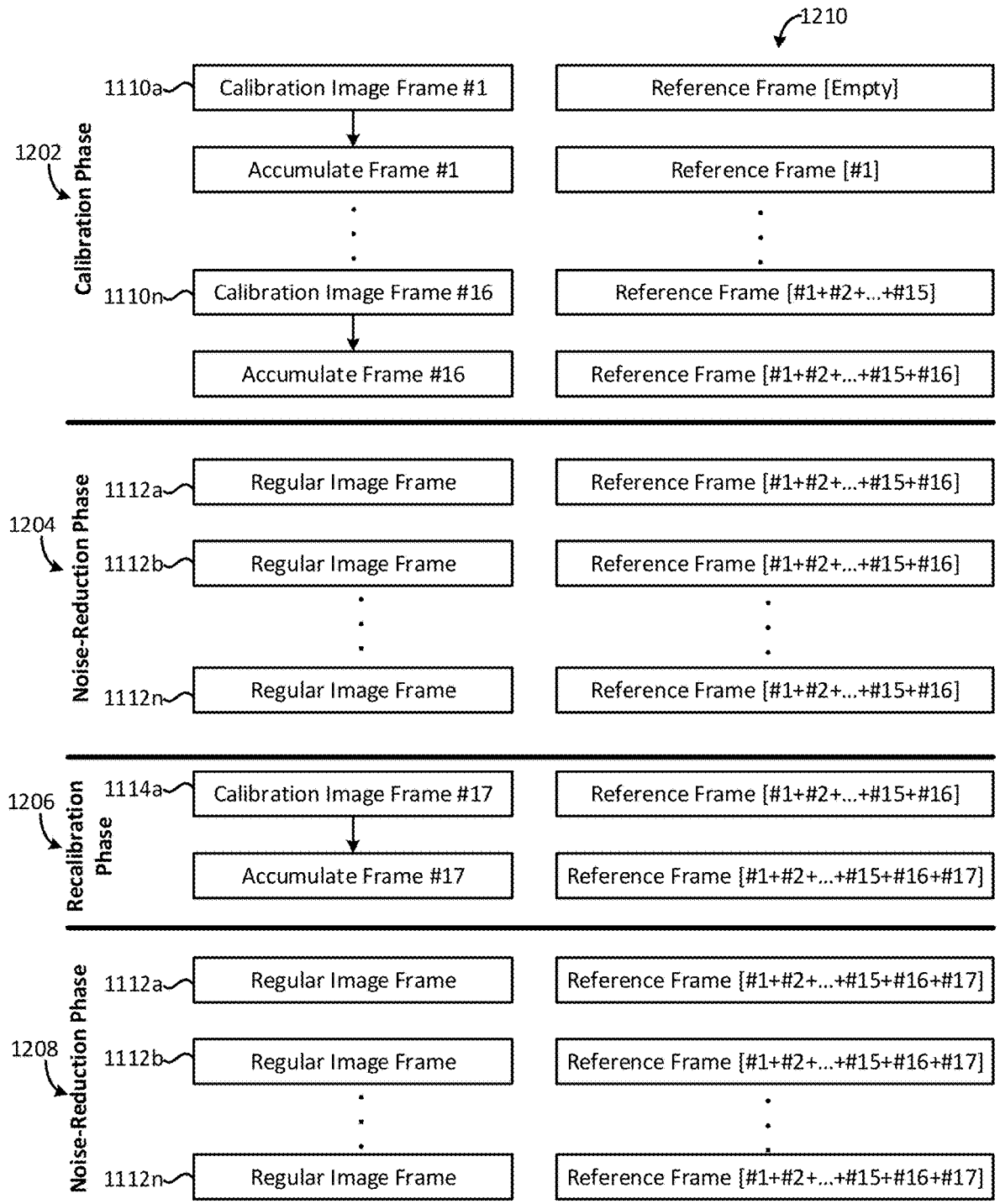
FIG. 12 shows an example of operational phases associated with an image sensor and a noise-reduction circuit according to some aspects of the present disclosure.

An example of the operational modes/phases described above is shown in FIG. 12. Referring to FIGS. 11-12 together, the noise-reduction circuit 904 can begin in the calibration mode. The noise-reduction circuit 904 may automatically enter the calibration mode at startup (e.g., upon turning on). The calibration mode is configured to implement the calibration phase 1202.

During the calibration phase 1202, the noise-reduction circuit 904 can receive a predefined number of calibration image frames 1110*a-n* from the image sensor 902. In FIG. 12, the predefined number of calibration image frames 1110*a-n* is 16. This number of calibration image frames 1110*a-n* may be advantageous because, when the reference frame 1106 needs to be consumed by the processor 1108 for noise correction, only some of the most significant bits are required (e.g., the four least significant bits can be ignored when capturing 16 reference frames). This approach can allow for frame averaging, without having to perform a dividing operation at the expense of complex dividing circuitry. But in other examples, more or fewer calibration image frames 1110*a-n* may be used. The predefined number may be a configurable setting stored in the noise-reduction circuit 904, such as in memory 1104.

The noise-reduction circuit 904 (e.g., the reference frame generator 1102) can combine the predefined number of calibration image frames 1110*a-n* to produce a reference frame 1106. For example, the noise-reduction circuit 904 can accumulate the calibration image frames 1110*a-n* to produce the reference frame 1106. An example of this process is shown in the right-hand column 1210 of FIG. 12. As shown, the reference frame 1106 is initially empty. As each calibration image frame is received, the noise-reduction circuit 904 adds it to the reference frame 1106. After the predefined number of calibration image frames 1110*a-n* have been received and accumulated, the result can be a reference frame that is the combination (e.g., sum) of those calibration image frames 1110a-n. The noise-reduction circuit 904 can store the reference frame 1106 in memory 1104. Then, the noise-reduction circuit 904 can transition to the noise-reduction mode.

In the noise-reduction mode, the noise-reduction circuit 904 can implement the noise-reduction phase 1204. In the noise-reduction phase 1304, the noise-reduction circuit 904 (e.g., processor 1108) can receive the reference frame 1106. For example, the processor 1108 can retrieve the reference frame 1106 from memory 1104. The noise-reduction circuit 904 can also receive any number of image frames 1112a-n from the image sensor 902. The image frames 1112a-n may not have previously undergone any noise correction. The noise-reduction circuit 904 can apply the reference frame 1106 to the image frames 1112a-n to reduce noise therein, thereby generating corrected image frames 916. It will be appreciated that during the noise-reduction phase 1204, the reference frame 1106 remains fixed—i.e., it does not change. An example of this is shown in the right-hand column 1210 of FIG. 12, where the reference frame 1106 remains the accumulation of the 16 calibration image frames 1110a-n received during the calibration phase 11002.

In some examples, an event may occur that triggers the recalibration mode. The event can be detected by the noise-reduction circuit 904. Examples of the event may include a physical impact to the image sensor 902, the ambient temperature proximate to the image sensor 902 exceeding a predefined threshold, the temperature of a hardware component of the image sensor 902 exceeding a predefined threshold, a predefined period of time elapsing, an update to the software (e.g., firmware) of the image sensor 902, or any combination of these. In response to detecting such an event, the noise-reduction circuit 904 can automatically enter the recalibration mode.

To assist with event detection, in some examples the image sensor 902 can include one or more sensors configured to generate sensor signals and transmit them to the noise-reduction circuit 904. Examples of the sensors can include temperature sensors, accelerometers, gyroscopes, voltmeters, ammeters, inclinometers, or any combination of these. The sensor signals can include measurements taken by the sensors. The noise-reduction circuit 904 (e.g., the processor 1108) can receive the sensor signals and analyze them to detect a predefined event. For example, the noise-reduction circuit 904 may include an algorithm or lookup table that can be used to detect a predefined event based on one or more characteristics of the sensor signals. Examples of such characteristics can include amplitudes, waveforms, digital values, and/or frequencies associated with one or more sensor signals. In response to detecting the predefined event, the noise-reduction circuit 904 can automatically enter the recalibration mode.

In the recalibration mode, the noise-reduction circuit 904 can implement the recalibration phase 1206. In the recalibration phase 1206, the noise-reduction circuit 904 (e.g., the reference frame generator 1102) can receive one or more additional calibration image frames, such as calibration image frame 1114a. The noise-reduction circuit 904 can use the one or more additional calibration image frames to update the existing reference frame 1106, thereby generating an updated reference frame 1116. An example of this is shown in the right-hand column 1210 of FIG. 12, where the reference frame 1106 is updated based on a $17^{th}$ calibration image frame 1114a received during the recalibration phase 1206. Updating the reference frame 1106 may involve incorporating the one or more additional calibration image frames 1114a-n into the existing reference frame 1106. For example, the noise-reduction circuit 904 can generate the updated reference frame 1116 by averaging the calibration image frame 1114a and the existing reference frame 1106.

In some examples, the noise-reduction circuit 904 can perform a weighted averaging process during recalibration phase 1206 to generate the updated reference frame 1116. For example, the noise-reduction circuit 904 can generate the updated reference frame 1116 (URF) by performing a weighted rolling update in accordance with the following equation:

$$URF = (\text{Existing Ref. Frame})W_o + (\text{New Calibration Image})*F*(1-W_o)$$

where (Existing Ref. Frame) represents the existing reference frame 1106, (New Calibration Image) represents the additional calibration image frame 1114a captured during the recalibration phase 1206, Wo is a weighting factor, and F is the total number of calibration image frames acquired during the calibration phase 1202. The weighting factor (Wo) can be selected to assign sufficient weight to the additional calibration image frame 1114a. The weighting factor can be adjusted based on how dramatically the environmental factors (e.g., temperature) are changing or based on other factors. If a detected event (e.g., a temperature change) is small in magnitude and the image sensor 902 has been functional for a long time, a larger weighting (e.g., ⅞ or 15/16) can be selected. Conversely, if a detected event is large in magnitude, a smaller weighting (e.g., ½ or ¼) can be selected. This may give more representation to the additional calibration image frame 1114a. In some examples, the weighting may be dynamically adjustable over the course of operation of the noise-reduction circuit 904 based on its length of operation and/or the magnitude of the detected event (e.g., temperature change).

In the example shown in FIG. 12, 16 image frames are chosen as F, so the above equation can be written as:

$$URF = (\#1-\#16)*(0.75) + (\#17)*(16)*(1-(0.75))$$

where (#1–#16) represents the existing reference frame 1106 that is the accumulation of the original 16 calibration image frames 1110a-n captured during the calibration phase 11002; (#17) represents the additional calibration image frame 1114a captured during the recalibration phase 1206; and the weighting factor (Wo) is 0.75. This means the original reference frame 1106 contributes 75% of the updated reference frame 1116, while the additional calibration image frame 1114a contributes 25% of the updated reference frame 1116.

After completing the recalibration phase, the noise-reduction circuit 904 can reenter the noise-reduction mode to begin a second noise-reduction phase 1208. The second noise-reduction phase 1208 can be similar to the first noise-reduction phase 11004, only with the updated reference frame 1116 being used to reduce the noise in subsequently captured image frames, rather than the original reference frame 1106.

Aspects of the above process can repeat as needed. For example, the noise-reduction circuit 904 can repeatedly and automatically switch between the recalibration mode and the noise-reduction mode during its course of operation. For instance, after initiating the second noise-reduction phase 1208, the noise-reduction circuit 904 may detect an event. In response to detecting the event, the noise-reduction circuit 904 can automatically reenter the recalibration mode and initiate a second recalibration phase. Upon completing the second recalibration phase, the noise-reduction circuit 904 can then automatically reenter the noise-reduction mode and initiate a third noise-reduction phase. And so on.

Figure 13:
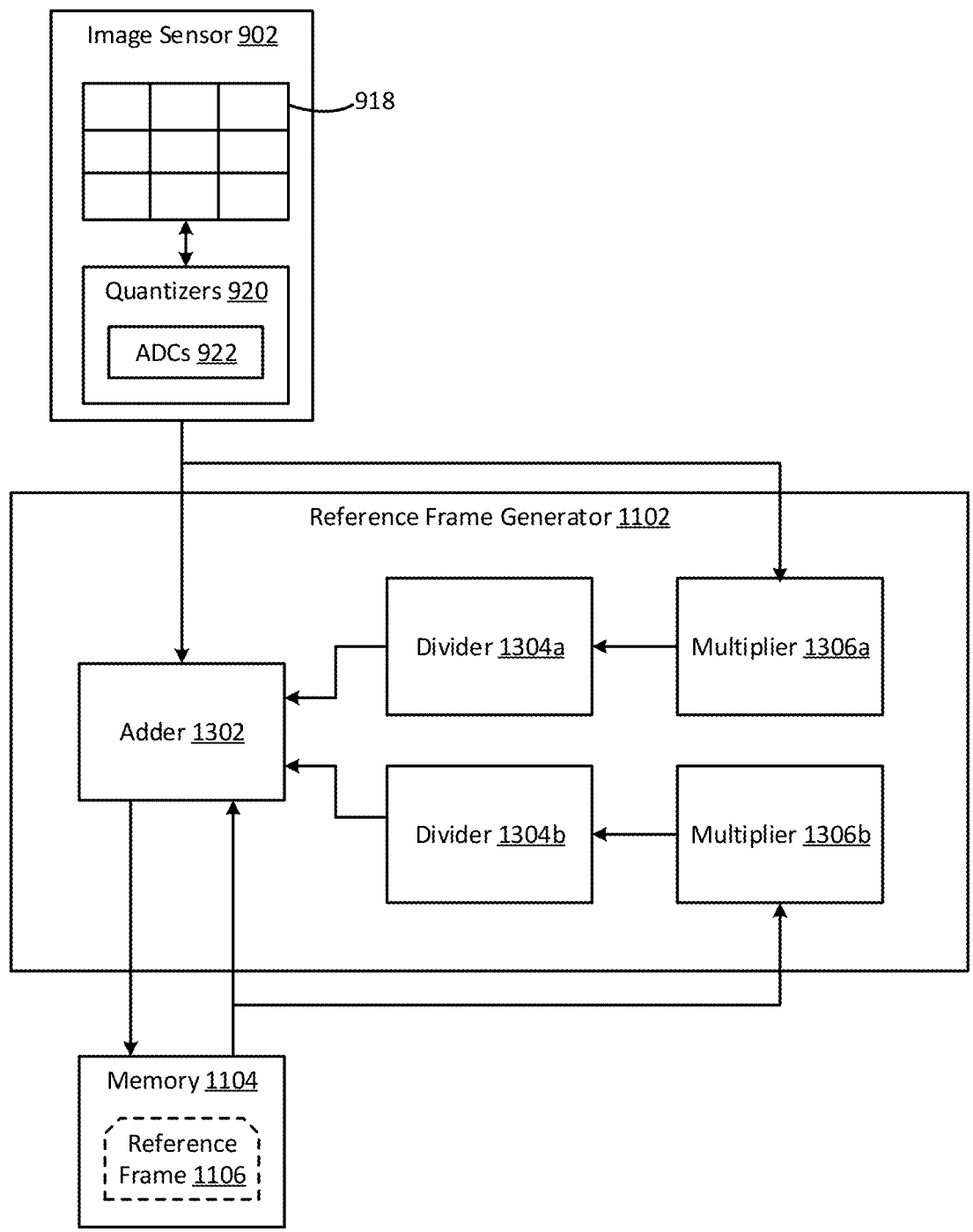
FIG. 13 shows an example of a reference frame generator according to some aspects of the present disclosure.

As noted above, the reference frame generator 1102 may be configured to generate the reference frame 1106 during the calibration phase and generate an updated reference frame 1116 during the recalibration phase. Any combination of software and/or hardware may be used to implement the reference frame generator 1102. One example implementation of the reference frame generator 1102 is shown in FIG. 13. In this example, the reference frame generator 1102 includes hardware components (e.g., integrated circuits, logic gates, processors, transistors, capacitors, resistors, and inductors) configured to implement basic arithmetic operations. In particular, the reference frame generator 1102 includes an adder 1302, multipliers 1306*a-b*, and dividers 1304*a-b*, each of which may be a hardware component configured to perform the corresponding arithmetic operation. The multipliers 1306*a-b* can be coupled to the dividers 1304*a-b*, which in turn can be coupled to the adder 1302. The adder 1302 can be coupled to the memory 1104 and the image sensor 902 (e.g., the outputs of the quantizers 920). The adder 1302 can be used to perform the addition/accumulation of calibration image frames 1110*a-n* during the calibration phase. The multipliers 1306*a-b* and dividers 1304*a-b* can be used to implement a weighted rolling update during the recalibration phase. Of course, in other examples the reference frame generator 1102 may include more components, fewer components, different components, or a different combination of components than is shown in FIG. 13. For instance, in another example the reference frame generator may include a processor programmed to perform some or all of the abovementioned arithmetic operations.

Figure 14:
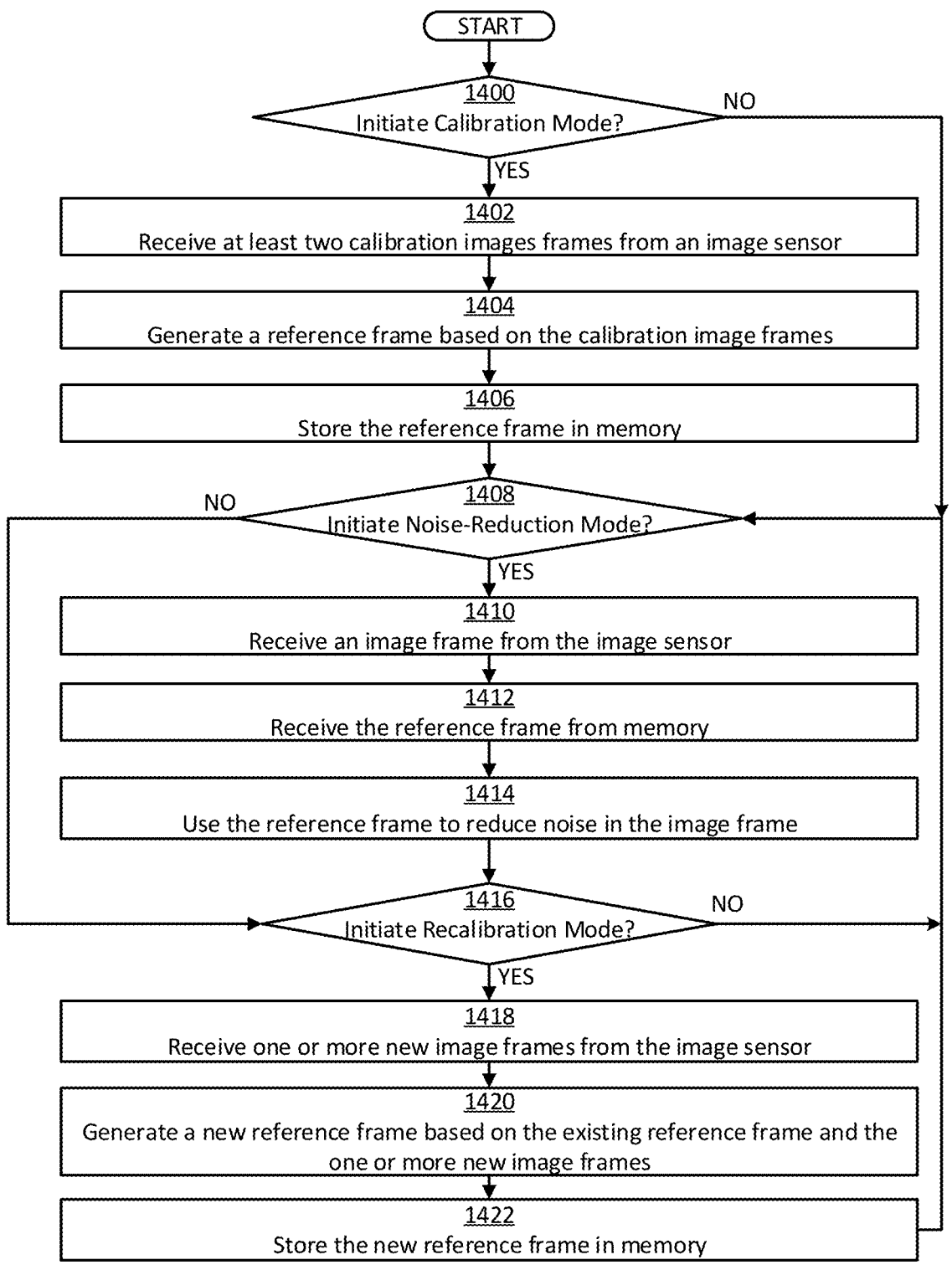
FIG. 14 shows an example of a process for switching between operational modes of a noise-correction circuit according to some aspects of the present disclosure.

FIG. 14 shows an example of a process for switching between operational modes of a noise-reduction circuit 904 according to some aspects of the present disclosure. Other examples may include more steps, fewer steps, different steps, or a different order of steps than is shown in FIG. 14. The steps of FIG. 14 are described below with reference to the components of FIG. 11 above.

In block 1400, the noise-reduction circuit 904 determines whether to initiate a calibration mode. For example, the processor 1108 or the reference frame generator 1102 can determine whether to initiate the calibration mode. The noise-reduction circuit 904 may automatically initiate the calibration mode in response to detecting one or more events. Examples of such events may include a startup event (e.g., the noise-reduction circuit 904 being turned on), a noise level in a digital image exceeding a predefined threshold, receiving a particular input from a user, receiving a particular input from a hardware component (e.g., an external processor) coupled to the noise-reduction circuit 904, or any combination of these.

In block 1402, the noise-reduction circuit 904 receives calibration image frames 1110*a-n* from an image sensor 902. For example, the reference frame generator 1102 can receive the calibration image frames 1110*a-n* from the image sensor 902. The noise-reduction circuit 904 can receive any number of calibration image frames 1110*a-n*. The number may be selected by a user or manufacturer of the noise-reduction circuit 904. In some examples, the number may be customizable or dynamically adjustable based on one or more factors, such as environmental conditions associated with the image sensor 902.

In block 1404, the noise-reduction circuit 904 generates a reference frame 1106 based on the calibration image frames 1110*a-n*. For example, the reference frame generator 1102 can generate the reference frame 1106 based on the calibration image frames 1110*a-n*. The reference frame 1106 may be generated by combining together some or all of the calibration image frames 1110*a-n*. In some such examples, the noise-reduction circuit 904 can combine together the calibration image frames 1110*a-n* by performing pixel-by-pixel averaging of the calibration image frames 1110*a-n*.

In block 1406, the noise-reduction circuit 904 stores the reference frame 1106 in memory 1104. For example, the reference frame generator 1102 can store the reference frame 1106 in memory 1104. In some examples, the memory 1104 may be a volatile memory in which stored data is erased when powered off. For example, the memory 1104 may include an SRAM buffer that may not retain any data when powered off.

In block 1408, the noise-reduction circuit 904 determines whether to initiate a noise-reduction mode. For example, the processor 1108 can determine whether to initiate the noise-reduction mode. The noise-reduction circuit 904 can initiate the noise-reduction mode in response to completing the calibration phase (e.g., in response to storing the reference frame 1106 in memory 1104). If the noise-reduction circuit 904 determines that the noise-reduction mode is to be initiated, the process can proceed to block 1408. Otherwise, the process may proceed to block 1416.

In block 1410, the noise-reduction circuit 904 receives an image frame 1112*a* from the image sensor 902. In some examples, the image frame 1112*a* may be a raw image frame that has not previously undergone any noise correction or other preprocessing. In other examples, the image frame 1112*a* may have undergone some limited preprocessing prior to being received by the noise-reduction circuit 904.

In block 1412, the noise-reduction circuit 904 receives the reference frame 1106 from memory 1104. For example, the processor 1108 can retrieve the reference frame 1106 from memory 1104.

In block 1414, the noise-reduction circuit 904 uses the reference frame 1106 to reduce noise in the image frame 1112*a*. For example, the processor 1108 can use the reference frame 1106 to reduce noise in the image frame 1112*a*. This may involve subtracting the reference frame 1106 from the image frame 1112*a* to generate a corrected image frame 916*a*. Subtracting the reference frame 1106 from the image frame 1112*a* may be a type of noise cancellation.

In block 1416, the noise-reduction circuit 904 determines whether to initiate a recalibration mode. For example, the processor 1108 can determine whether to initiate the recalibration mode. The noise-reduction circuit 904 can initiate the recalibration mode in response to detecting an event, for example in response to detecting a temperature change that is greater than or equal to a threshold amount. If the noise-reduction circuit 904 determines that the recalibration mode is to be initiated, the process can proceed to block 1418. Otherwise, the process may return to block 1408.

In block 1418, the noise-reduction circuit 904 receives one or more new image frames (e.g., additional calibration image frame 1114*a-n*) from the image sensor 902. For example, the reference frame generator 1102 can receive the one or more new image frames from the image sensor 902.

In block 1420, the noise-reduction circuit 904 generates a new reference frame (e.g., an updated reference frame 1116) based on the existing reference frame 1106 and the one or more new image frames. For example, the reference frame generator 1102 can generates the new reference frame by combining the existing reference frame 1106 and the one or more new image frames. This may be performed by applying a weighting scheme to the existing reference frame 1106 and the one or more new image frames.

In block 1422, the noise-reduction circuit 904 stores the new reference frame in memory 1104. For example, the reference frame generator 1102 can store the new reference frame in memory 1104 for subsequent use. Depending on the size of the memory 1104, the noise-reduction circuit 904 may store one or both of the original reference frame 1106 and the new reference frame in memory 1104. For example, if the memory 1104 is small, the noise-reduction circuit 904 may overwrite the original reference frame 1106 with the new reference frame in memory 1104. If the memory 1104 is large, the noise-reduction circuit 904 may maintain copies of both the original reference frame 1106 with the new reference frame in memory 1104. After the new reference frame is stored in memory 1104, the process may then return to block 1408, where the noise-reduction circuit 904 may again initiate the noise-reduction mode.

Some or all of the above process can iterate any number of times. For example, steps 1408-1416 may iterate multiple times over the course of operation of the noise-reduction circuit 904.

In some examples, the process may return to block 1400 and restart the calibration process from the beginning. For example, the noise-reduction circuit 904 can detect an event. In response to detecting the event, the noise-reduction circuit 904 can restart the calibration process by deleting some or all of the stored reference frames from memory 1104 and re-entering the calibration mode (at block 1400). The noise-reduction circuit 904 can then perform the initial calibration phase again. This may occur if, for example, the event corresponds to a significant change in the configuration of the image sensor 902, which may warrant a complete restart of the calibration process.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may include a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing cap ability.

Embodiments of the disclosure may also relate to a product that is produced by a computing process described herein. Such a product may include information resulting from a computing process, where the information is stored on a non-transitory, tangible computer-readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The invention claimed is:

1. A noise-reduction circuit comprising:
a reference frame generator configured to generate a reference frame based on a plurality of image frames generated by an image sensor during a calibration phase in which pixels of the image sensor do not capture light;
a memory coupled to the reference frame generator, the memory being configured to receive the reference frame from the reference frame generator and store the reference frame for subsequent use during a first noise-reduction phase that is subsequent to the calibration phase; and
a processor coupled to the memory, the processor being configured to:
during the first noise-reduction phase, retrieve the reference frame from the memory and use the reference frame to reduce noise in an image frame received from the image sensor;
subsequent to the first noise-reduction phase, initiate a recalibration phase in which a new reference frame is generated based on the reference frame and at least one additional image frame generated by the image sensor; and
subsequent to the recalibration phase, initiate a second noise-reduction phase in which the new reference frame is used to reduce noise in multiple image frames received from the image sensor.

2. The noise-reduction circuit of claim 1, wherein the noise-reduction circuit is part of the image sensor.

3. The noise-reduction circuit of claim 1, wherein the reference frame generator is configured to generate the reference frame by averaging together the plurality of image frames.

4. The noise-reduction circuit of claim 3, wherein the plurality of image frames includes more than five image frames.

5. The noise-reduction circuit of claim 1, wherein the processor is configured to use the reference frame to reduce the noise in the image frame by subtracting the reference frame from the image frame to generate a corrected image frame.

6. The noise-reduction circuit of claim 1, wherein the noise includes temporal noise generated by one or more analog-to-digital converters of the image sensor.

7. The noise-reduction circuit of claim 1, wherein the image sensor is a digital pixel sensor with a pixel array configured to be coupled to the noise-reduction circuit.

8. The noise-reduction circuit of claim 1, wherein the reference frame generator is further configured to execute the recalibration phase by:
receiving a new image frame from the image sensor;
receiving the reference frame from the memory;
generating the new reference frame by combining the new image frame with the reference frame; and
storing the new reference frame in the memory, wherein storing the new reference frame in the memory involves overwriting the reference frame with the new reference frame.

9. The noise-reduction circuit of claim 8, wherein the reference frame generator is configured to generate the new reference frame by applying a weighted averaging scheme to the reference frame and the new image frame, the new image frame having a lower weight in the weighted averaging scheme than the reference frame.

10. A method comprising:
receiving, by a noise-reduction circuit, a plurality of image frames generated by an image sensor during a calibration phase in which pixels of the image sensor do not capture light;
generating, by the noise-reduction circuit, a reference frame based on the plurality of image frames;
subsequent to the calibration phase, executing, by the noise-reduction circuit, a first noise-reduction phase in which the reference frame is used to reduce noise in an image frame from the image sensor;
subsequent to the first noise-reduction phase, executing, by the noise-reduction circuit, a recalibration phase in which a new reference frame is generated based on the reference frame and at least one additional image frame from the image sensor; and
subsequent to the recalibration phase, executing, by the noise-reduction circuit, a second noise-reduction phase in which the new reference frame is used to reduce noise in multiple image frames received from the image sensor.

11. The method of claim 10, wherein the noise-reduction circuit is part of the image sensor.

12. The method of claim 10, wherein the noise-reduction circuit is separate from the image sensor and coupled to the image sensor.

13. The method of claim 10, wherein generating the reference frame comprises averaging together the plurality of image frames.

14. The method of claim 10, wherein using the reference frame to reduce the noise in the image frame comprises:
subtracting the reference frame from the image frame to generate a corrected image frame.

15. The method of claim 10, wherein the noise includes fixed pattern noise and temporal noise generated by one or more analog-to-digital converters of the image sensor.

16. The method of claim 10, wherein
executing the recalibration phase involves:
receiving a plurality of new image frames from the image sensor; and
generating the new reference frame by combining the plurality of new image frames with the reference frame.

17. The method of claim 16, wherein generating the new reference frame comprises:
applying a weighted averaging scheme to the reference frame and the plurality of new image frames.

18. An artificial reality system, comprising:
an image sensor;
a noise-reducing circuit coupled to the image sensor, the noise-reducing circuit being configured to:
receive a plurality of image frames generated by the image sensor during a calibration phase in which pixels of the image sensor do not capture light;
generate a reference frame based on the plurality of image frames;
subsequent to the calibration phase, execute a first noise-reduction phase that involves receiving an image frame from the image sensor and generating a corrected image frame by using the reference frame to reduce noise in the image frame;
subsequent to the first noise-reduction phase, execute a recalibration phase in which a new reference frame is generated based on the reference frame and at least one additional image frame generated by the image sensor;
subsequent to the recalibration phase, execute a second noise-reduction phase in which the new reference frame is used to reduce noise in multiple image frames received from the image sensor; and
a computer system coupled to the noise-reducing circuit and a display device, the computer system being configured to generate an artificial reality environment for display on the display device based on the corrected image frame generated by the noise-reducing circuit.

19. The noise-reduction circuit of claim 1, wherein the image sensor is configured to control an exposure time of the pixels such that the pixels do not capture the light during the calibration phase.

* * * * *